United States Patent [19]

Kitajima et al.

[11] Patent Number: 5,192,976
[45] Date of Patent: Mar. 9, 1993

[54] SHEET ORIGINAL FEEDING APPARATUS WITH DETACHABLE AUXILIARY FEEDER

[75] Inventors: Tadayuki Kitajima, Yokohama; Masataka Naito, Kawasaki; Noriyoshi Ueda, Yokohama; Katsuaki Hirai; Takeshi Honjo, both of Kawasaki; Yuji Morishige, Yokohama; Akimaro Yoshida, Tokyo, all of Japan

[73] Assignee: Canon Kabushiki Kaisha, Tokyo, Japan

[21] Appl. No.: 921,615

[22] Filed: Aug. 3, 1992

Related U.S. Application Data

[63] Continuation of Ser. No. 868,328, Apr. 14, 1992, abandoned, which is a continuation of Ser. No. 610,045, Nov. 5, 1990, Pat. No. 5,132,741.

[30] Foreign Application Priority Data

| Nov. 5, 1989 | [JP] | Japan | 1-287741 |
| Nov. 5, 1989 | [JP] | Japan | 1-287742 |
| Nov. 5, 1989 | [JP] | Japan | 1-287743 |
| Nov. 5, 1989 | [JP] | Japan | 1-287744 |

[51] Int. Cl.⁵ ............................................. G03G 15/00
[52] U.S. Cl. ..................................... 355/309; 355/313; 271/3.1; 271/9
[58] Field of Search ............... 355/309, 313, 319, 321, 355/23; 271/3.1, 9

[56] References Cited

U.S. PATENT DOCUMENTS

| 4,231,561 | 11/1980 | Kaneko et al. ............ 271/3.1 |
| 4,469,319 | 9/1984 | Robb et al. ............... 271/3.1 |
| 4,629,311 | 12/1986 | Kaneko et al. ........... 355/319 |
| 4,921,236 | 5/1990 | Saeki et al. ............... 271/3.1 |

FOREIGN PATENT DOCUMENTS

| 0108840 | 5/1984 | European Pat. Off. |
| 0409309 | 1/1991 | European Pat. Off. |
| 60-026551 | 2/1985 | Japan |
| 63-180667 | 7/1988 | Japan |

OTHER PUBLICATIONS

"Copier Document Feeder," IBM Technical Disclosure Bulletin, vol. 31, No. 1, Jun., 1988, N.Y., pp. 389–390.

*Primary Examiner*—Joan H. Pendegrass
*Attorney, Agent, or Firm*—Fitzpatrick, Cella, Harper & Scinto

[57] ABSTRACT

A sheet original feeding apparatus includes a sheet original stacking tray on which sheet originals to be treated are stacked as an original stack; a sheet original separating means for separating and supplying the sheet original one by one from the bottom of the original stack stacked on the sheet original stacking tray; a sheet original feeding path for directing the sheet original separated by the sheet original separating means; a sheet original feeding means for feeding the sheet original directed by the original feeding path to an image reading portion; a sheet original ejecting path for ejecting the sheet original fed by the sheet original feeding means to the sheet original stacking tray; and an auxiliary sheet original feeding apparatus which can be connected to the sheet original ejecting path. When the auxiliary sheet original feeding apparatus is connected, the sheet original ejecting path serves as a bypass for directing the sheet original from the auxiliary sheet original feeding apparatus to the sheet stacking tray.

7 Claims, 25 Drawing Sheets

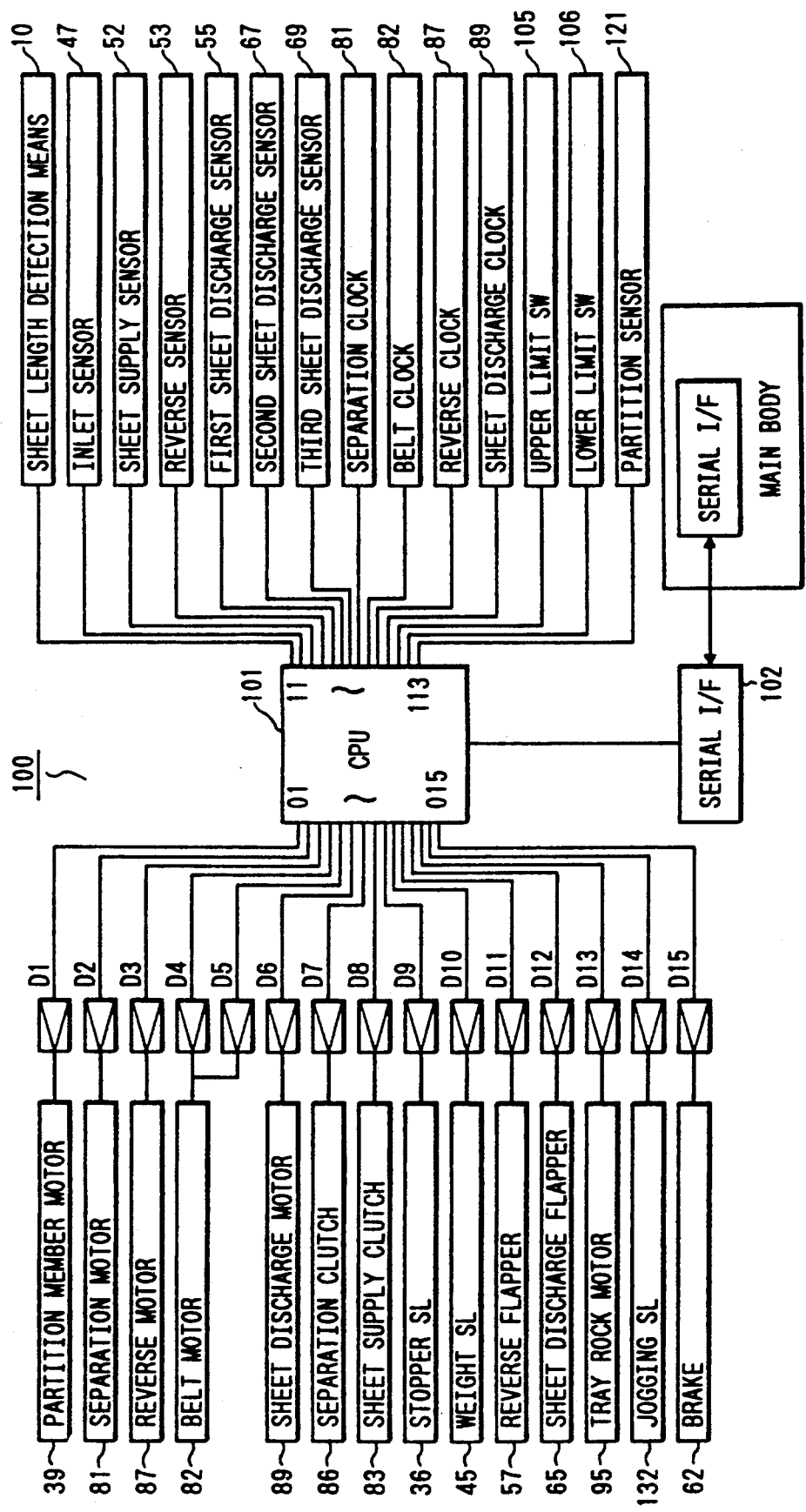

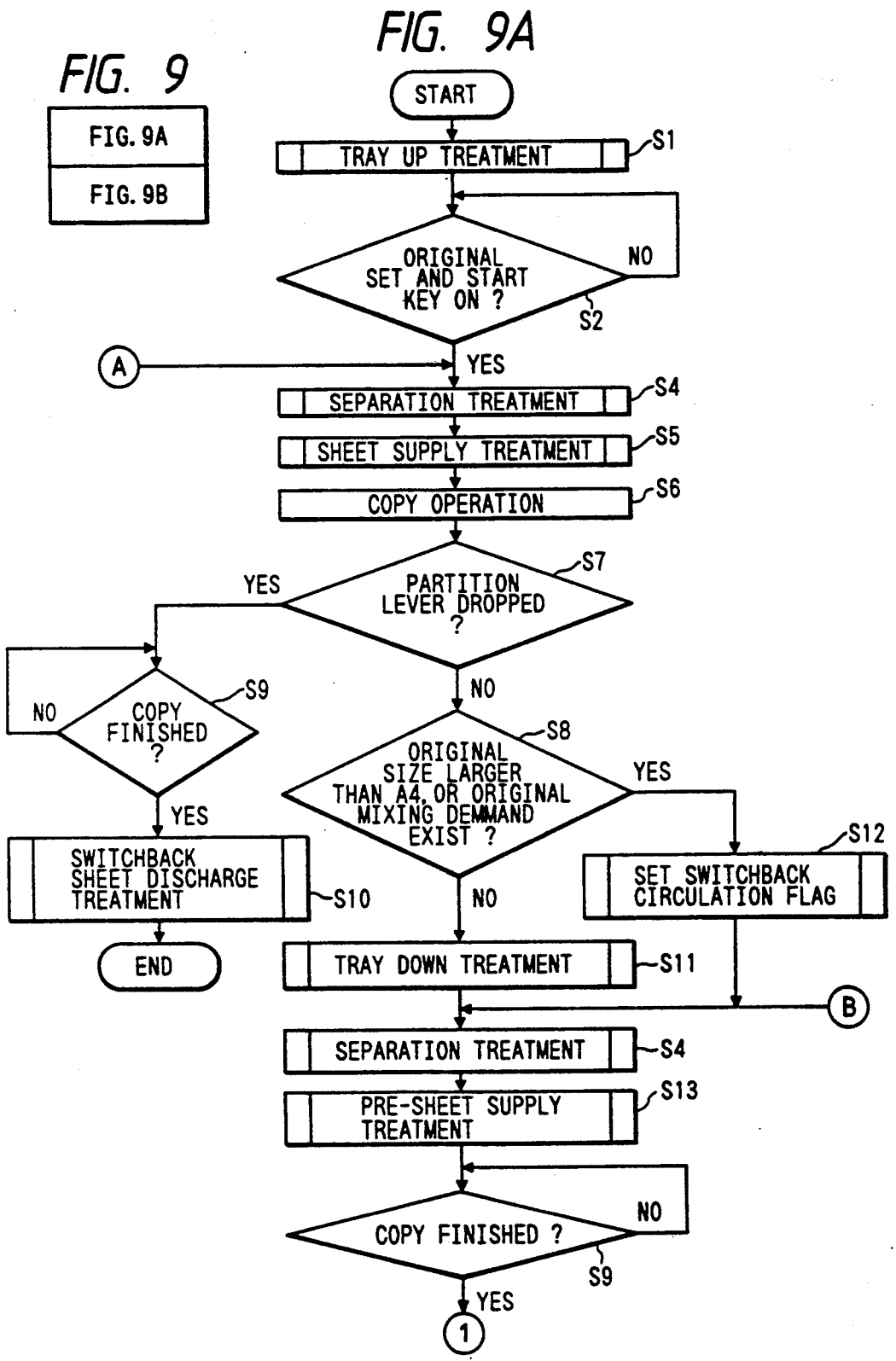

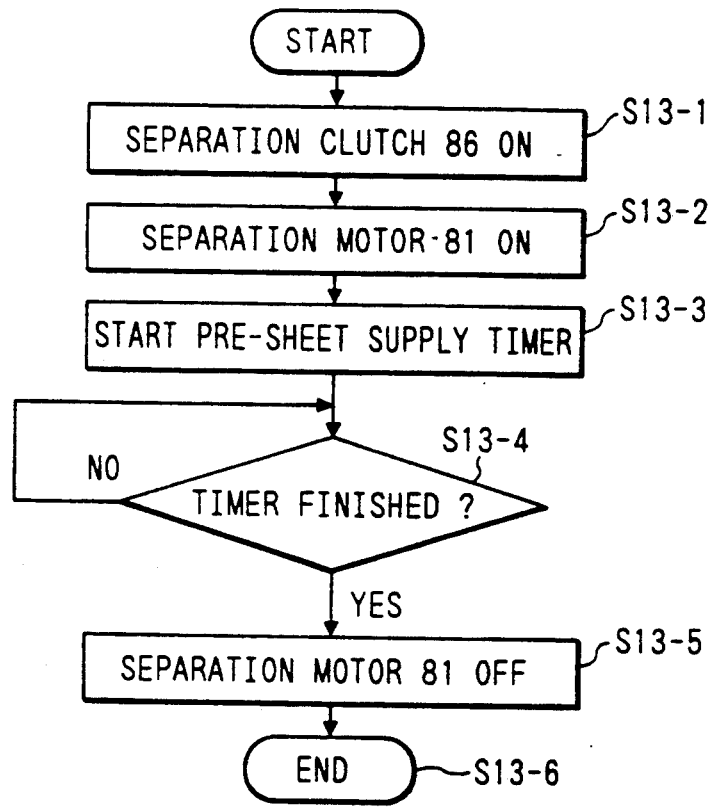

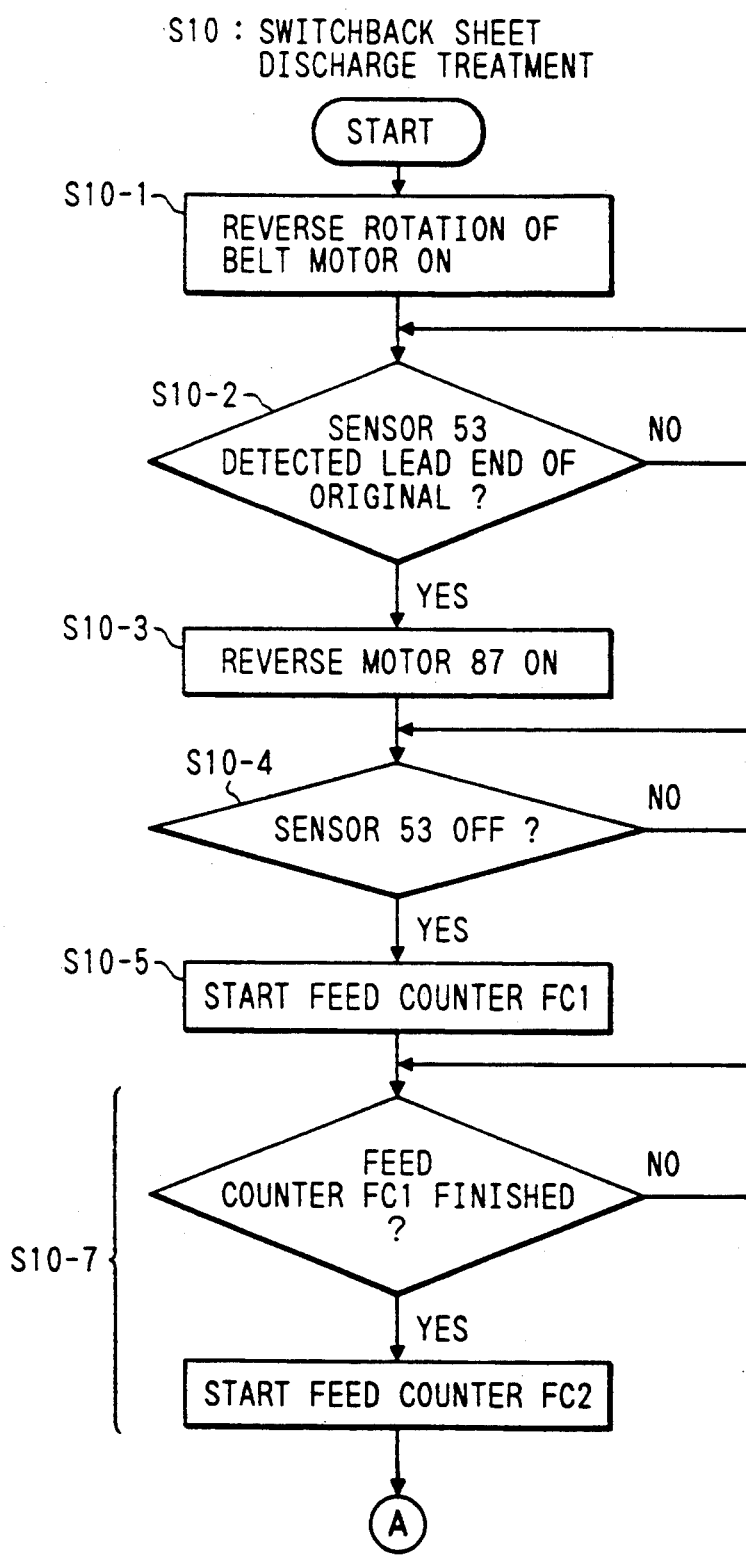

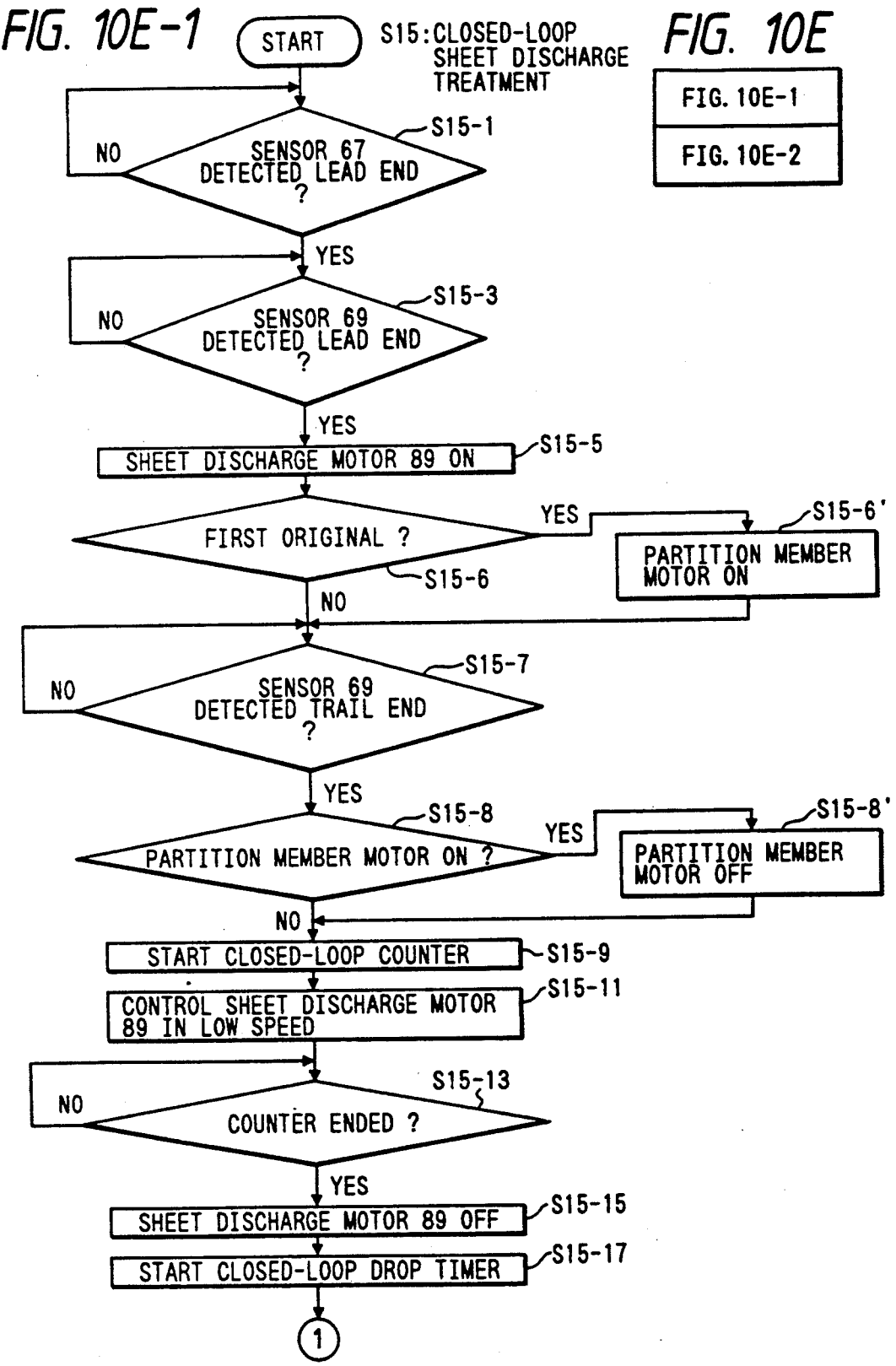

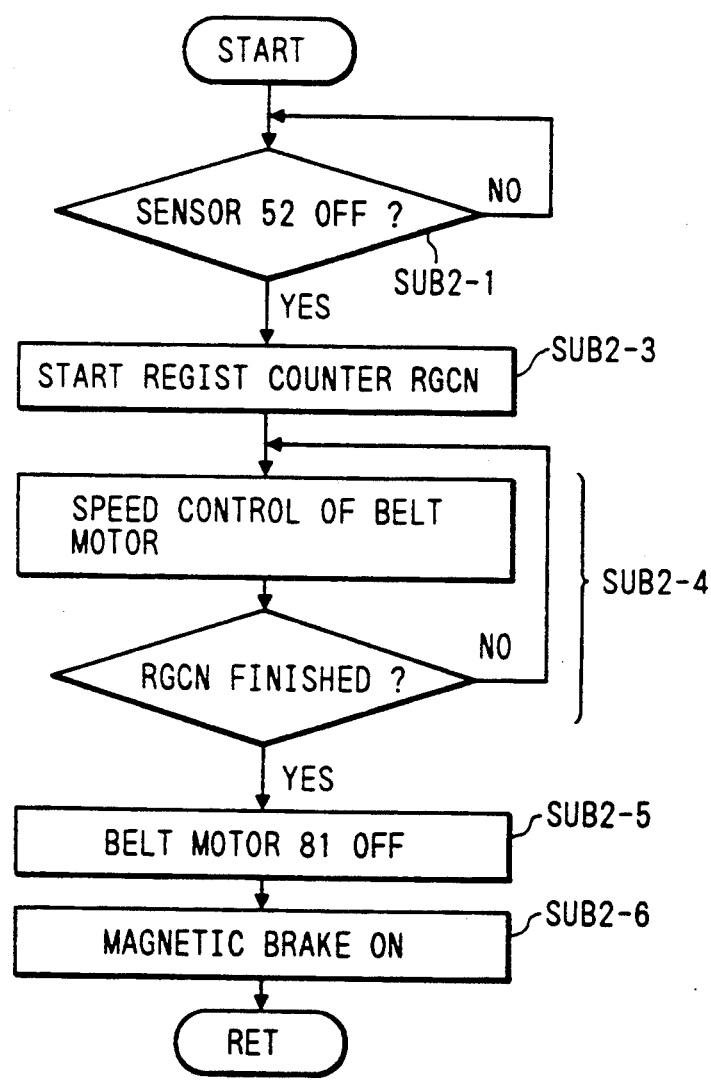

SHEET ORIGINAL FEEDING APPARATUS WITH DETACHABLE AUXILIARY FEEDER

This application is a continuation of application Ser. No. 07/868,328 filed Apr. 14, 1992, now abandoned, which in turn is a continuation of application Ser. No. 07/610,045 filed Nov. 5, 1990, now U.S. Pat. No. 5,132,741 issued on Jul. 21, 1992.

BACKGROUND OF THE INVENTION

1. Field of the Invention

The present invention relates to a sheet original feeding apparatus which feeds a sheet original to a predetermined position such as an image forming portion in an image forming system such as a copying machine, laser beam printer and the like, and an image forming system used with such sheet original feeding apparatus.

2. Related Background Art

In the past, one kind of sheet original feeding apparatus wherein an original is automatically fed to and rested on a predetermined position on a platen of a copying machine (as an image forming system) and the treated original is returned to an original stacking tray has been proposed. Such original feeding apparatus includes a circulating original feeding apparatus of switch-back type (referred to as "switch-back RDF" hereinafter) as shown in FIG. 1 and a circulating original feeding apparatus of closed-loop type (referred to as "closed-loop RDF" hereinafter) as shown in FIG. 2.

In the switch-back RDF shown in FIG. 1, an original is separated one by one from the bottom of an original stack P rested on an original tray 1 and is fed to a predetermined position on a platen 3 of a copying machine A. The original is stopped there, and an image on the original is read by an optical mechanism of the copying machine. After the image has been read, the sheet original P is conveyed from the platen 3 by switching back the sheet original P toward a same direction as a direction that the original is fed to the platen and is returned onto the original stack P in the original tray 1 by feeding the sheet original by means of a large roller 49 rotated in a direction shown by the arrow and a small roller 49a abutted against the large roller. Thus, the sheet original P is fed from and returned to the same side of the original tray, and, by repeating the above-mentioned sequences, the image forming operation regarding a plurality of originals P is effected.

In the switch-back RDF C of this kind, each original (the image thereon having been treated) is returned to the original stack P on the original tray from the side facing the leading ends of the originals in the stack, and a trailing end of the returned original P is aligned with the leading end of the original stack at the original supply side when the returned original slides down on the original stack toward the original supply side due to the inclination of the original tray. Therefore, even when the sheet originals P having different lengths in the original feeding direction are stacked on the original tray 1, the leading ends of the sheet originals are aligned with each other without fail.

Further, even regarding large-sized originals having different lengths in the original feeding direction, by extending the length of the original tray 1 by using an auxiliary tray, the sheet originals P can be re-stacked on the original tray 1 with good alignment of the leading ends thereof, without affecting a bad influence upon the original feeding path and/or the feeding operation.

Further, in the switch-back RDF C of this kind, in the case where the sheet original P rested on the platen 3 is replaced by a next sheet original P, when the leading end of the first original is positively pinched by the feeding means nearest the platen at a downstream side of the platen 3 (i.e., the large roller 49 and small roller 49a), a moving direction of a wide belt 2 which is a feeding means on the platen 3 is reversed to feed the next original to the platen, thus the first original (original after treated) and the next original (before treated) pass each other when exchanging the originals. In this way, the original exchanging time is shortened and the productivity of the original treatment is increased.

On the other hand, in the closed-loop RDF D shown in FIG. 2, an original is separated one by one from the bottom of an original stack P rested on an original tray 1 and is fed to a predetermined position on a platen 3 of a copying machine A and is stopped there. After the image of the original has been read, the original P is conveyed from the platen 3 toward a direction (right in FIG. 2) opposite to a direction that the original is fed to the platen and is returned onto the original stack P in the original tray 1 from a side opposite to an original supply side. By repeating this operation, the originals are circulated in a closed-loop path.

Further, since the feeding of the treated original can be initiated immediately after the image of the original has been treated and at the same time the feeding of the next original to the platen 3 can be started, the original exchanging operation can be performed without any time loss, thus further shortening the original exchanging time in comparison with the above-mentioned switch-back RDF C.

However, in the switch-back RDF C shown in FIG. 1, since there was the time loss between the completion of the treatment of the first original and the initiation of the feeding of the next original (that is to say, the feeding of the next original cannot be initiated before the first treated original is pinched by the downstream feeding means), the improvement in the productivity of the original treatment was limited to a certain extent To the contrary, in the closed-loop RDF D shown in FIG. 2, there was less time loss in comparison with the switch-back RDF C. However, in the closed-loop RDF, the treated original is re-stacked on the original stack P from the side opposite to the original supply side of the original tray 1. Thus, if the originals P having different lengths in the original feeding direction are mixed in the original stack, since an original returning inlet is positioned behind a trailing end of the longest original in the original tray, it is feared that the leading end of the original to be ejected will strike against the trailing end of the original rested on the original tray to be fed, with the result that a stable and reliable original circulating operation cannot be attained. Accordingly, in such original feeding apparatus, only originals having the same lengths can be treated, and the originals having different lengths cannot be treated.

Further, in order to prevent the leading end of the ejected original from striking the trailing end of the original stack P rested on the original tray, noting that the original returning inlet must be positioned near the trailing end of the original stack P rested on the original tray 1, it is necessary to vary the position of the original returning inlet in accordance with the size of the sheet original P. Consequently, since the length of an original ejecting path extending from the platen 3 to the original returning inlet must also be varied, there arise disadvantages causing the construction of the original feeding apparatus itself to become complicated and the cost of the apparatus to increase. Further, since the construction for varying the length of the original ejecting path is considerably limited, the width of available originals is inevitably limited.

SUMMARY OF THE INVENTION

The present invention aims to eliminate the above-mentioned conventional drawbacks, and an object of the present invention is to provide a sheet original feeding apparatus which can treat originals at a high speed.

More specifically, for example, the object of the present invention is to provide a sheet original original is ejected in a switch-back mode, whereas, if the sheet originals have the same small size, each original is ejected in a closed-loop mode, whereby the productivity of the image treatment is improved.

BRIEF DESCRIPTION OF THE DRAWINGS

FIG. 8 is a block diagram showing the circuitry of an RDF control means;

FIGS. 9A, 9B, 10A to 10D, 10D-1, 10D-2, 10E, 10E-1, 10E-2 and 10F to 10J are flow charts associated with the sheet original feeding apparatus according to the embodiment of the present invention;

DETAILED DESCRIPTION OF THE PREFERRED EMBODIMENTS

The present invention will now be explained in connection with embodiments thereof with reference to the accompanying drawings.

Figure 1:
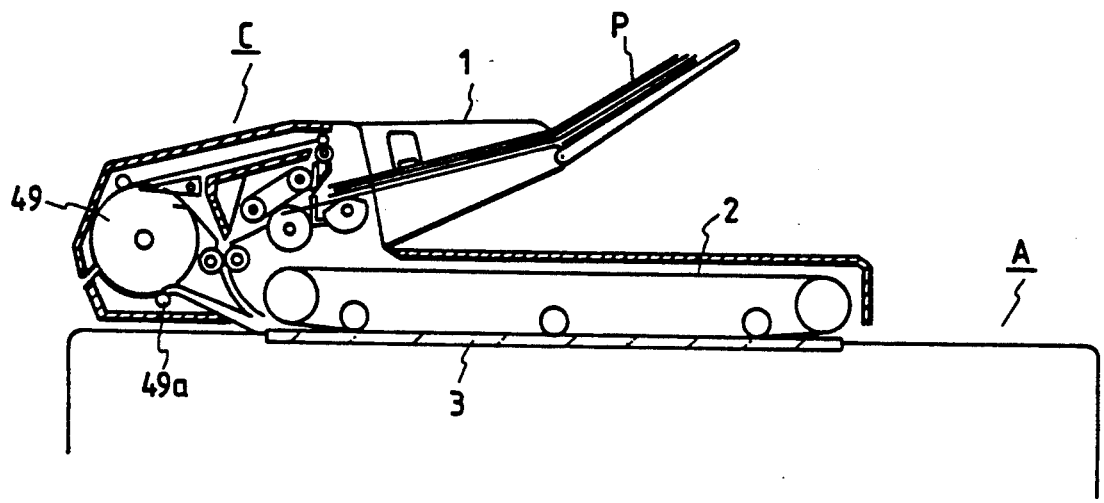
FIGS. 1 and 2 are sectional elevational views showing examples of conventional sheet original feeding apparatuses.
Figure 2:
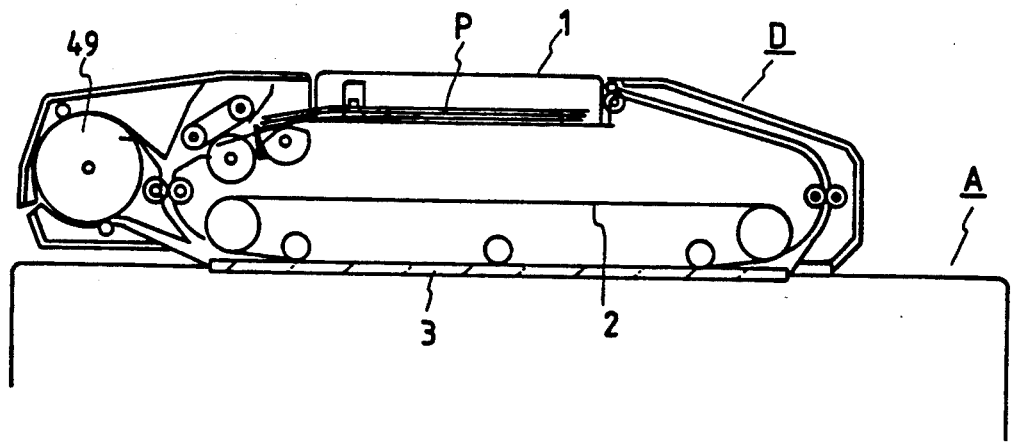
Figure 3:
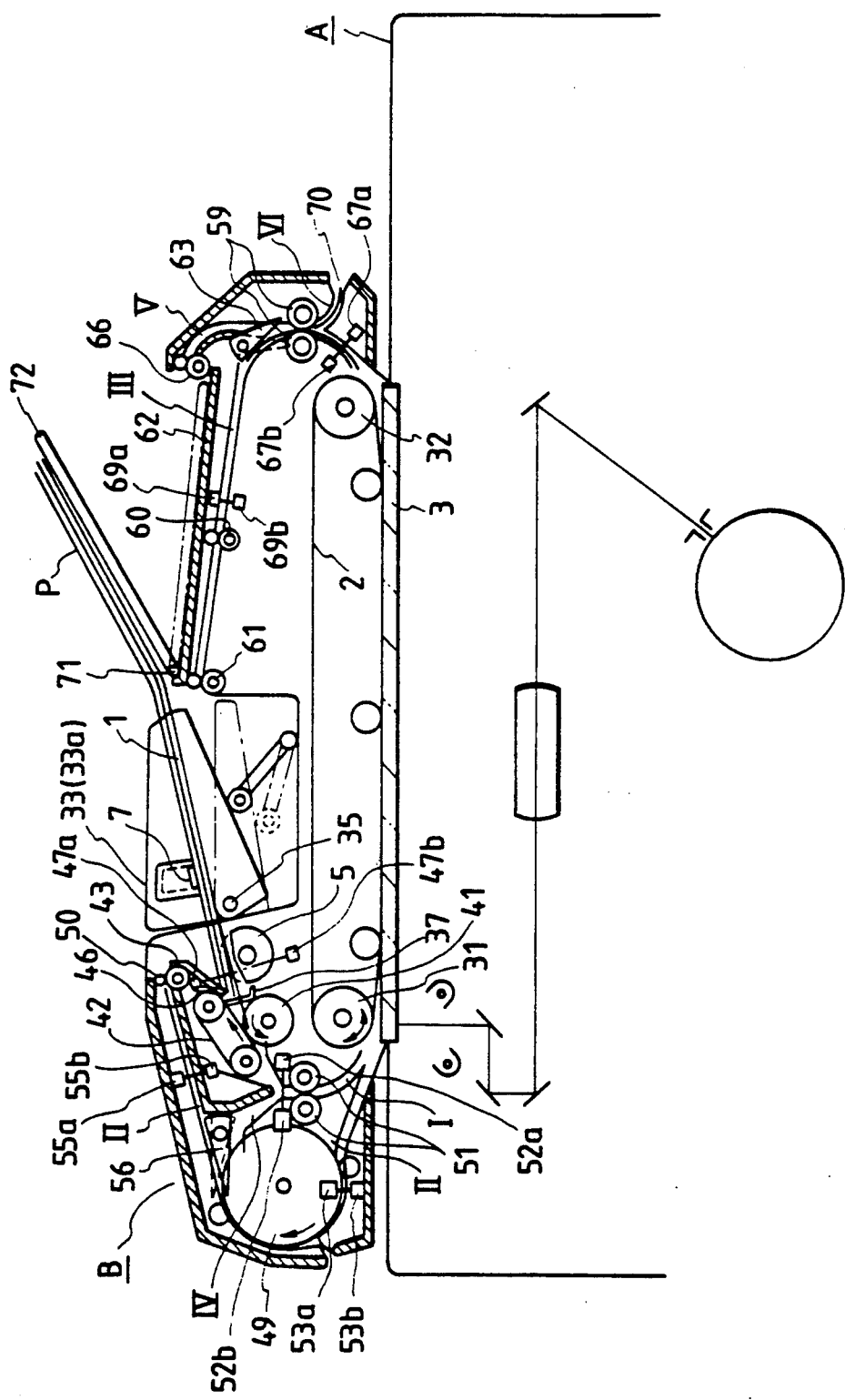
FIG. 3 is a sectional elevational view of a sheet original feeding apparatus according to a preferred embodiment of the present invention.

In FIG. 3, an RDF (circulating original feeding apparatus) B as a sheet original feeding apparatus has an original tray 1 at its upper part. Below the original tray 1, a wide belt 2 extending between and engaged by a driving roller 31 and a turn roller 32 is disposed. The wide belt 2 is abutted against a platen 3 of a copying machine A and serves to move the sheet original P fed from the original tray 1 to a predetermined position on the platen 3 and to eject the sheet original rested on the platen 3 toward the original tray 1.

Further, a pair of original width regulating plates 33 are disposed on the original tray 1 in such a manner that they can be slid in a direction of the width of the sheet original P, so that they regulate the positions of the edges of the sheet originals P rested on the original tray 1 to ensure the stable feeding of the sheet original P and the alignment of the sheet originals on the original tray 1. The original width regulating plates or original reference guides 33 incorporate therein a jogging mechanism which will be described later and which urges each sheet original returned to the original tray 1 against the original reference guides 33 to further improve the alignment of the sheet originals. Further, the regulating plates 33 can be rocked around a pivot 35 between a position shown by the solid line and a position shown by a phantom line in FIG. 3, by means of an original tray lifting/lowering mechanism which will be described later.

A semi-circular sheet supply roller 5, and a stopper 37 shifted in an up-and-down direction by a stopper solenoid 36 (see FIG. 8) are disposed adjacent to the original tray 1, so that the sheet original P set on the original tray 1 does not protrude toward a downstream side by being regulated by the protruding stopper 37.

When the copying condition is inputted in an operation portion of the copying machine and a start key is depressed, the stopper 37 is retracted to open the original feeding path, and the sheet original P is advanced toward the downstream side by means of the sheet supply roller 5. In this case, a partition member 40 connected to a partition member motor 39 (see FIG. 8) incorporated into the original reference guide 33 on the original tray 1 is rotated to ride on an uppermost sheet original P in the original stack, thereby discriminating the non-treated originals from the treated originals.

At a downstream side of the stopper 37, there are arranged a feed roller 41 and a separating belt 42 which constitute a separating portion and which are rotated in directions shown by the arrows, respectively, to separate the sheet original supplied from the original tray 1 one by one and to feed the sheet original toward the downstream side.

Further, above the stopper 37, there is arranged a weight 43 which is shifted downwardly by a weight solenoid 45 (see FIG. 8) when the number of the sheet originals P on the original tray 1 is reduced and the sheet original P cannot be advanced toward the separating portion 41, 42 only by the feeding force of the supply roller 5, thereby urging the sheet original P against the supply roller 5 to increase the feeding force of the supply roller 5. An original regulating plate 46 is disposed near the separating belt 42, so that a plurality of sheet originals P are prevented from entering into the separating portion 41, 42 at a time.

An original feeding path I is formed between the separating portion 41, 42 and the platen 3, which original feeding path I is curved to be contiguous to the feeding path on the platen 3 and serves to direct the sheet original P onto the platen 3. Further, in the vicinity of the supply roller 5, there are arranged inlet sensors 47a, 47b consisting of optical sensors of permeable type for detecting the presence/absence of the sheet original P on the original tray 1.

A large roller 49 is disposed at the left part of the RDF B, and a first original ejecting path II is formed to extend from the platen 3 to the above position of the original tray 1 through the periphery of the large roller 49. An original reversing path IV is branched from the first original ejecting path II above the large roller 49, which original reversing path serves to turn over the surface of the sheet original. A downstream end of the original reversing path IV is joined to the original feeding path I. At a downstream side of the first original ejecting path II, there is disposed a first sheet discharge roller or ejector roller 50 for conveying the sheet original fed from the first original ejecting path II onto the original stack P on the original tray 1.

The wide belt 2 disposed on the platen 3 serves to move the sheet original P to a predetermined position on the platen 3 and to stop the original there, and to eject the original from the platen 3 after an image of the original is read. A sheet feeding roller 51 is disposed at a joint portion between the original feeding path I and the original reversing path IV, which roller 51 serves to form a loop in the sheet original P (reached this roller) for preventing the skew-feed of the sheet original P. At an upstream side of and in the vicinity of the feeding roller 51, there are disposed optical sensors (sheet supply sensors) of permeable type 52a, 52b for detecting a leading end and a trailing end of the sheet original P, so that the sheet original P passed through either the original feeding path I or the original reversing path IV can be detected.

Below the large roller 49 in the first original ejecting path II, there are disposed optical sensors (reverse sensors) of permeable type 53a, 53b for detecting the sheet original P ejected from the platen 3, and further, in the first original ejecting path II between the large roller 49 and the first sheet discharge roller 50, there are disposed optical sensors (first sheet discharge sensors) of permeable type 55a, 55b for detecting the passage of the sheet original P passed through the first original ejecting path II and ejected onto the original tray 1.

At a branched portion between the first original ejecting path II and the original reversing path IV, there is disposed a flapper 56 for switching over the paths, which flapper can be rocked between a position shown by the solid line in FIG. 3 and a position shown by the phantom line by ON/OFF of a reverse flapper solenoid 57 (see FIG. 8) to switch over the paths.

Further, at the right part of the RDF B, a second original ejecting path III is provided for ejecting the sheet original P (after the image thereon has been read) from the platen 3 toward a side opposite to a side to which the sheet original has been fed.

In the second original ejecting path III, there are disposed first and second sheet conveying rollers 59, 60 for conveying the sheet originals P in the second original ejecting path III, and further, at a downstream side of the second original ejecting path III, there is arranged a second sheet feed roller 61 for ejecting the sheet original P fed from the second original ejecting path III onto the uppermost original in the original stack P rested on the original tray 1.

An original ejector tray 62 is disposed above the second original ejecting path III, and a third original ejecting path V is branched from the second original ejecting path III near the downstream side of the first sheet conveying roller 59 and extends up to the original ejector tray 62. At a branched portion between the second and third original ejecting paths III and V, there is disposed an ejector flapper 63 for switching over the paths, which flapper can be rocked between a position shown by the solid line in FIG. 3 and a position shown by the phantom line by ON/OFF of a sheet discharge flapper solenoid 65 (see FIG. 8) to switch over the paths.

At a downstream side of the third original ejecting path V, there is disposed a third sheet discharge or ejector roller 66 for ejecting the sheet original P fed from the third original ejecting path V onto the ejector tray 62. Optical sensors (second sheet discharge sensors) of permeable type 67a, 67b for detecting the leading end and the trailing end of the sheet original P in the ejecting path are arranged in the second original ejecting path III between the platen 3 and the first conveying roller 59, and third sheet discharge sensors 69a, 69b are disposed between the branched portion (between the second and third original ejecting paths III and V) and the second conveying roller 60.

An original introducing inlet 70 is formed in a right side surface of the RDF and serves to receive the sheet original into the RDF from outside. An original introducing path VI extends from the original introducing inlet 70 and is joined to the second original ejecting path III at the upstream side of the first conveying roller 59.

An auxiliary tray 72 rockable around a front pivot 71 is disposed in the original ejector tray 62 in such a manner that the tray 72 can be rocked between a position shown by the solid line in FIG. 3 and a position shown by the phantom line in response to the up-and-down rocking movement of the original tray 1 as will be described later. That is to say, when the original tray 1 is in the position shown by the solid line in FIG. 3, the auxiliary tray 72 is cocked in the solid line position to improve the stacking of the large size sheet originals P, whereas, when the original tray 1 is in the position shown by the phantom line in FIG. 3, the auxiliary tray 72 is retracted to the phantom line position to permit the ejecting and stacking of the sheet originals onto the original ejector tray 62.

Next, a driving mechanism of the RDF according to the present invention will be explained with reference to FIG. 4.

Figure 4:
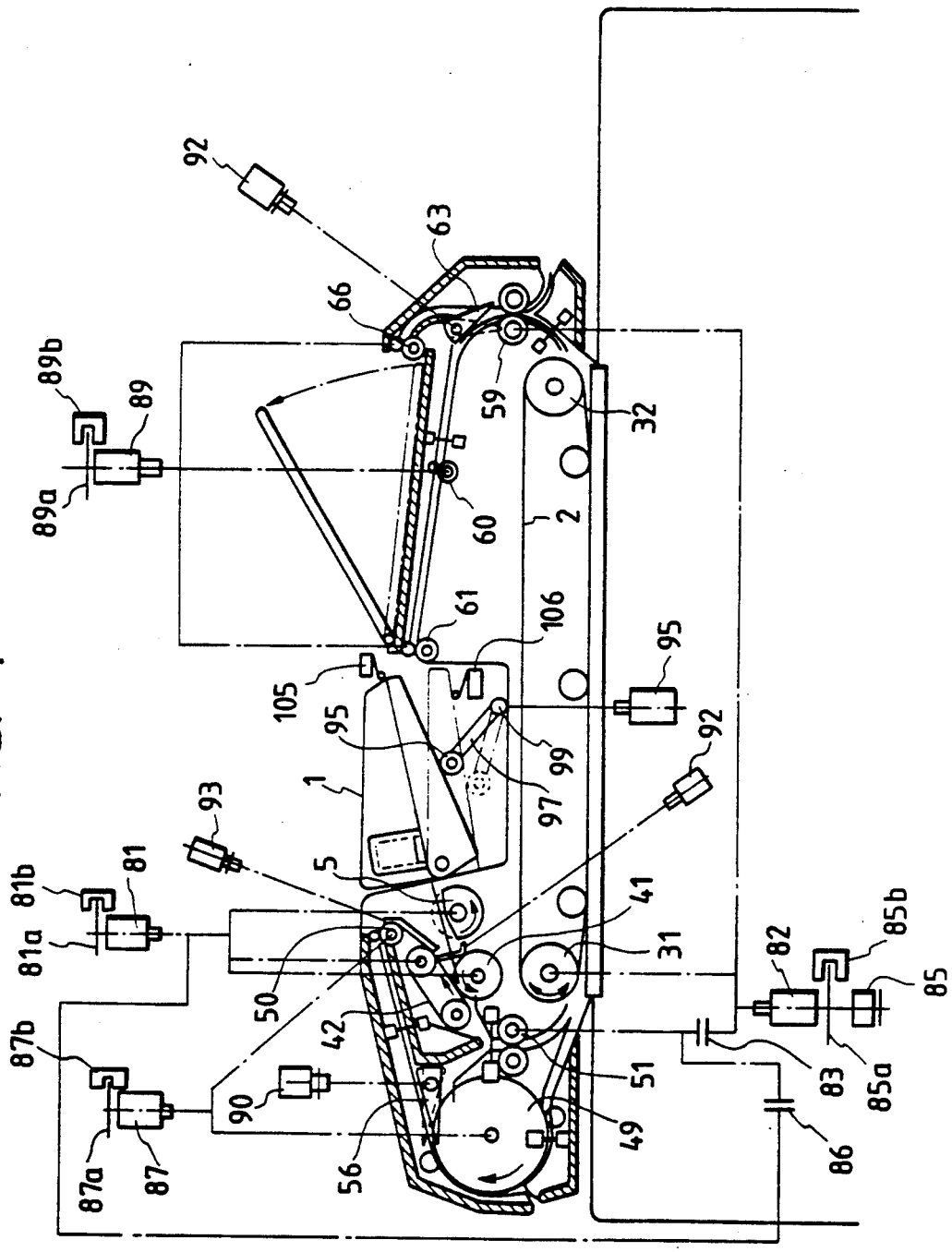
FIG. 4 is a sectional elevational view similar to FIG. 3, but also showing a driving mechanism of the apparatus.

FIG. 4 shows a driving mechanism including motors and solenoids for driving various rollers and flappers.

In FIG. 4, a separation motor 81 drives the feed roller 41 and the separating belt 42 (constituting the separating portion) in the directions shown by the arrows in FIG. 4. A belt motor 82 drives the feeding roller 51 through a sheet supply clutch 83 and further drives the driving roller 31 for driving the wide belt 2, and further drives the first conveying roller 59. The rotation of the driving roller 31 is transmitted to the turn roller 32 through the wide belt 2. Further, on a motor shaft of the belt motor 82, a brake 85 is provided for ensuring the stopping position of the wide belt 2.

When the separation motor 81 is energized, the feeding roller 51 is driven through a separation clutch 86. A reverse motor 87 serves to drive the large roller 49 and the first sheet discharge roller 50. A sheet discharge motor 89 serves to drive the second conveying roller 60 and the third sheet discharge roller 66.

On motor shafts of the respective motors, clock discs 81a, 82a, 87a, 89a each having a plurality of slits are mounted, and clock sensors 81b, 82b, 87b, 89b are provided for generating pulses by detecting the slits by means of the associated optical sensors of permeable type. By clock counting the rotations of the respective motors by means of the clock sensors 81b, 82b, 87b, 89b, the rotation amounts of the respective rollers can be measured, and thus, the shifting amount of the sheet original P can be detected.

When a reverse flapper solenoid 90 for rocking the reverse flapper 56 is turned OFF, the reverse flapper 56 is positioned in the solid line position in FIG. 4 so that the sheet original P passed through the first original ejecting path II can be ejected onto the original tray 1; whereas, when the reverse flapper solenoid 90 is turned ON, the sheet original P passed through the first original ejecting path II is directed to the original reversing path IV.

When a sheet discharge flapper solenoid 91 for rocking the sheet discharge flapper 63 is turned OFF, the sheet discharge flapper 63 is positioned in the solid line position in FIG. 4 so that the sheet original P passed through the second original ejecting path III can be ejected onto the original tray 1; whereas, when the sheet discharge flapper solenoid 91 is turned ON, the sheet original P passed through the second original ejecting path VI is directed to the third original ejecting path V and is then ejected on the ejector tray 62.

The stopper solenoid 36 drives the stopper 37 in the up-and-down direction. When the stopper solenoid is turned OFF, the stopper 37 is positioned in the solid line position in FIG. 4 to prevent the movement of the sheet original P on the original tray 1 toward the downstream side; whereas, when the stopper solenoid is turned ON, the stopper is retracted to open the original feeding path.

A weight solenoid 93 serves to rock the weight 43 in the up-and-down direction. When the weight solenoid is turned OFF, the weight is positioned in a position shown in FIG. 4, whereas, when the weight solenoid is turned ON, the weight 43 is lowered to urge the sheet original P against the supply roller 5, thereby increasing the feeding force of the supply roller 5.

Next, the rocking movement of the original tray 1 will be explained.

An output motor shaft of a tray rock motor 95 is connected to a tray rock arm 97 which is engaged by an undersurface of the original tray 1. A tray rock roller 96 is mounted on one end of the tray rock arm 97, and the other end of the tray rock arm 97 is fixed to a tray rock arm shaft 99 so that, when the shaft 99 is rotated, the tray rock arm 97 can be rocked between a position shown by the solid line in FIG. 4 and a position shown by the phantom line, thus rocking the original tray 1 around the pivot 35 between the solid line position in FIG. 4 and the phantom line position.

The reference numeral 105 denotes an upper limit switch for detecting the fact that the original tray 1 reaches an upper position (solid line position); and 106 denotes a lower limit switch for detecting the fact that the original tray 1 reaches a lower position (phantom line position). The rotation of the tray rock motor 95 is controlled by the detection of the upper and lower limit switches 105, 106 (see FIG. 8).

Figure 5:
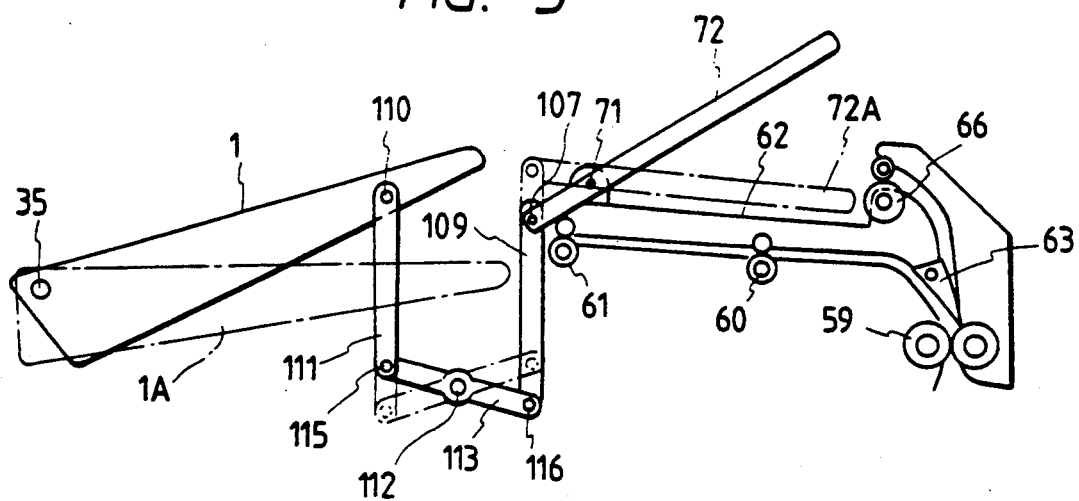
FIG. 5 is a side view showing a rocking mechanism for an original tray and an auxiliary tray.

Next, a sequential mechanism for the original tray 1 and the auxiliary tray 72 will be explained with reference to FIG. 5 showing such sequential mechanism.

The front pivot 71 around which the auxiliary tray 72 is rocked is fixed to the original ejector tray 62, and an end of the auxiliary tray 72 near the pivot 71 is connected to an auxiliary tray link 109 through an auxiliary tray link pin 107. Further, a portion of the original tray 1 far from the pivot 35 is connected to a tray link 111 through a tray link pin 110. A rock lever 113 is connected to both links 109, 111 through pins 116, 115, respectively, and can be rocked around a pivot 112 fixed to a frame of the RDF B.

With this arrangement, when the original tray 1 is rocked upwardly (to the solid line position), the auxiliary tray 72 is also rocked upwardly (to the solid line position) through the links, whereas, when the original tray 1 is rocked downwardly (to the phantom line position), the auxiliary tray 72 is also rocked downwardly (to the phantom line position) through the links.

Accordingly, when it is desired to stack the large size originals on the original tray 1, the original tray 1 is rocked upwardly, thereby rocking the auxiliary tray 72 upwardly. In this condition, a trailing end of each large size original does not depend down beyond the rear end of the original tray, with the result that the sheet originals P can be stacked on the tray with permitting the stable supplying of the original. Further, in case of the small size originals, the original tray 1 is rocked downwardly, thereby rocking the auxiliary tray 72 downwardly. In this condition, since the auxiliary tray is retracted into the original ejector tray 62, the sheet original P passed through the third original ejecting path V can be smoothly re-stacked on the upper surface of the original ejector tray 62.

Next, a partition member of the original tray 1 will be explained with reference to FIG. 6 showing the details of such partition member In FIG. 6, on an output shaft 117 of a partition member motor 39, there are coaxially arranged a partition flag 119 which is freely rotatingly supported, and a partition lever 120 which is fixed to the output shaft 117 and which serves to rotatingly drive the partition flag 119. As shown, the partition flag 119 has a cutout portion at its periphery, and a partition member 7 made of flexible material such as polyester film, leaf spring and the like is fixed to the peripheral surface of the partition flag 119. Thus, the partition member can be rotated together with the partition flag 119 around the output shaft 117.

Further, since the partition flag 119 has a center of gravity near the partition member 7, when the partition flag is not driven by the partition lever 120, the partition flag is stopped in a condition that the partition member is positioned at the bottom of the partition flag. By detecting the partition flag 119 by means of a partition sensor 121, the position of the partition member 7 is discriminated.

Figure 6A:
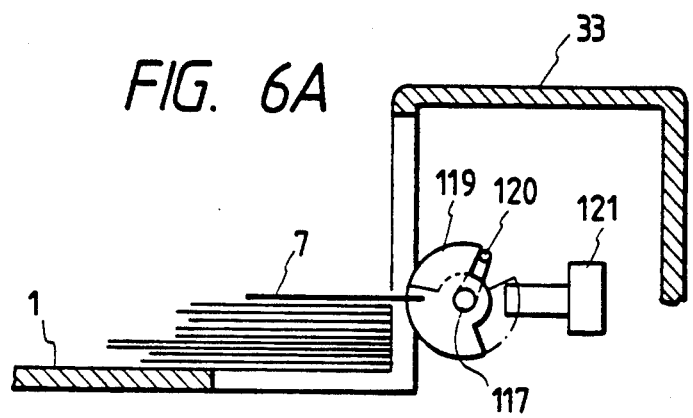
FIGS. 6A and 6B are sectional side views of a partition member.

In FIG. 6A, when a large number of the sheet originals P are stacked on the original tray 1, since a distance between an end surface of the original stack P and an attachment position where the partition member is attached to the partition flag is short and the partition member 7 is relatively firm, the partition member 7 does not deform and keeps a flat condition along the original stack P as shown.

Figure 6B:
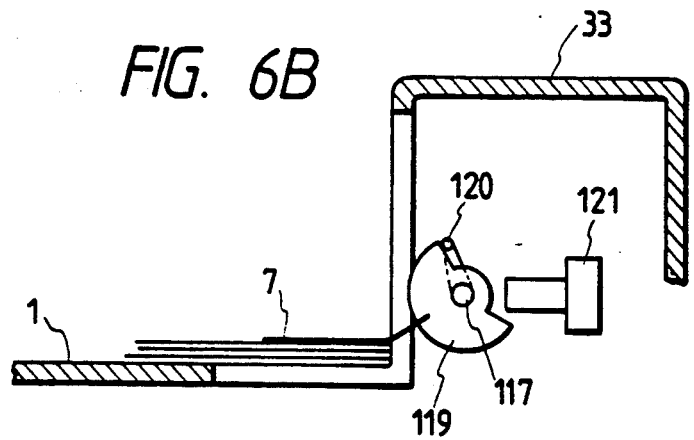

In FIG. 6B, when the number of the sheet originals P stacked on the original tray 1 is reduced, in the conventional rigid partition member, since the partition member was stopped in a condition that the free end of the partition member was engaged by the upper surface of the original stack P, the partition member was separated from the upper surface of the original stack at the end portion thereof (near the partition flag). And, when the sheet originals P were re-stacked on the partition member, the leading end of the sheet original struck against the partition member, thus preventing the stable re-stacking of the sheet originals. To the contrary, according to the present invention, since the partition member 7 is flexible, as shown in FIG. 6B, when the partition flag 119 is driven by the partition lever 120, the partition member 7 is flexed to wholly contact with the upper surface of the original stack P to keep a flat condition as similar to the case where the large number of originals are stacked on the original tray.

Therefore, since the partition member 7 always closely contacts with the upper surface of the original stack P regardless of the number of the sheet originals stacked on the original tray, when the sheet originals P are re-stacked on the partition member 7, the leading end of the sheet original does not strike against the partition member 7, thus permitting the stable re-stacking of the sheet originals without impeding the feeding of the sheet original.

Figure 7:
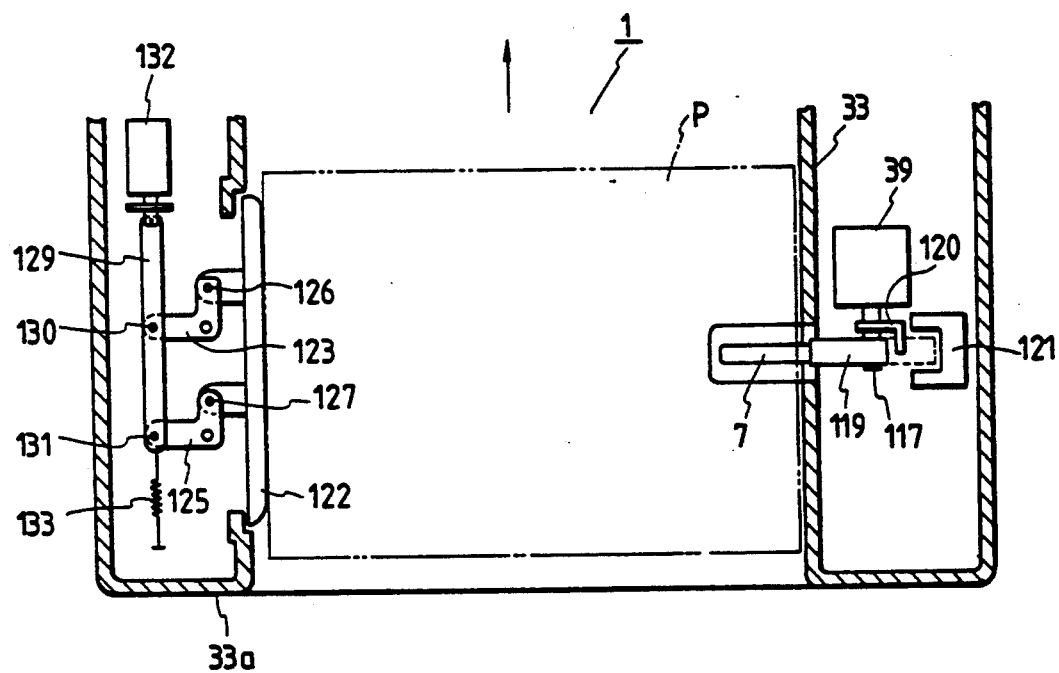
FIG. 7 is a plan view showing a jogging mechanism.

Next, a jogging mechanism will be explained with reference to FIG. 7 showing a plan view of the original tray.

In FIG. 7, a jogging guide 122 forming a part of the original width regulating plate 33a is retractably supported by the original width regulating plate 33a. At a side opposite to the original stack P, the jogging guide 122 is connected to two jogging links 123, 125 through link pins 126, 127. The other ends of the jogging links 123, 125 are connected to a jogging lever 129 through lever pins 130, 131, respectively.

Since the jogging lever 129 is engaged by a jogging solenoid 132, when the jogging solenoid 132 is turned ON, the jogging guide 122 is driven to urge the sheet original P against the original reference guide 33. On the other hand, when the jogging solenoid 132 is turned OFF, the jogging guide 122 is separated from the edge of the sheet original by means of a return spring 133. That is to say, whenever the sheet original P is rested on the original tray 1, by effecting the ON/OFF operation of the jogging solenoid 132, the sheet original P is positively urged against the original reference guide 33, thus improving the registration of the sheet originals P on the original tray 1.

Figure 11A:
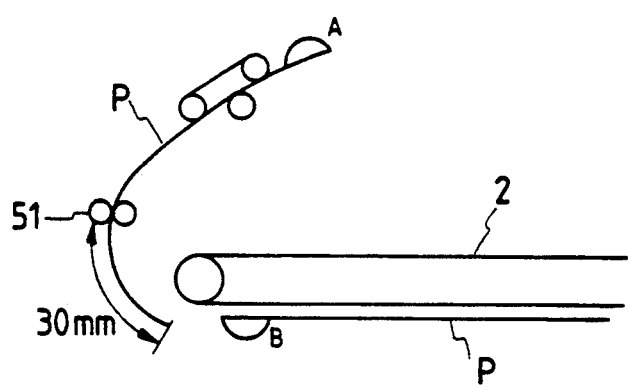
FIGS. 11A and 11B are schematic explanatory views for explaining a pre-sheet supply treatment.
Figure 11B:
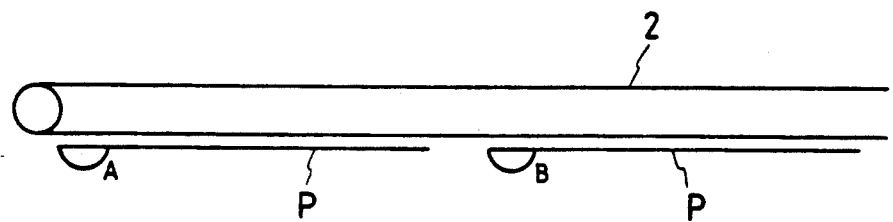

FIGS. 11A and 11B schematically show the sheet supply treatment in the closed-loop RDF B; as shown in FIG. 11A, when the image of the original B is read at a predetermined position, the wide belt 2 is rotated in an anti-clockwise direction (FIG. 11A) to convey the original B toward a side opposite to a side into which the original is introduced as shown in FIG. 11B and to introduce a next original A into the predetermined position as shown in FIG. 11B.

Figure 13:
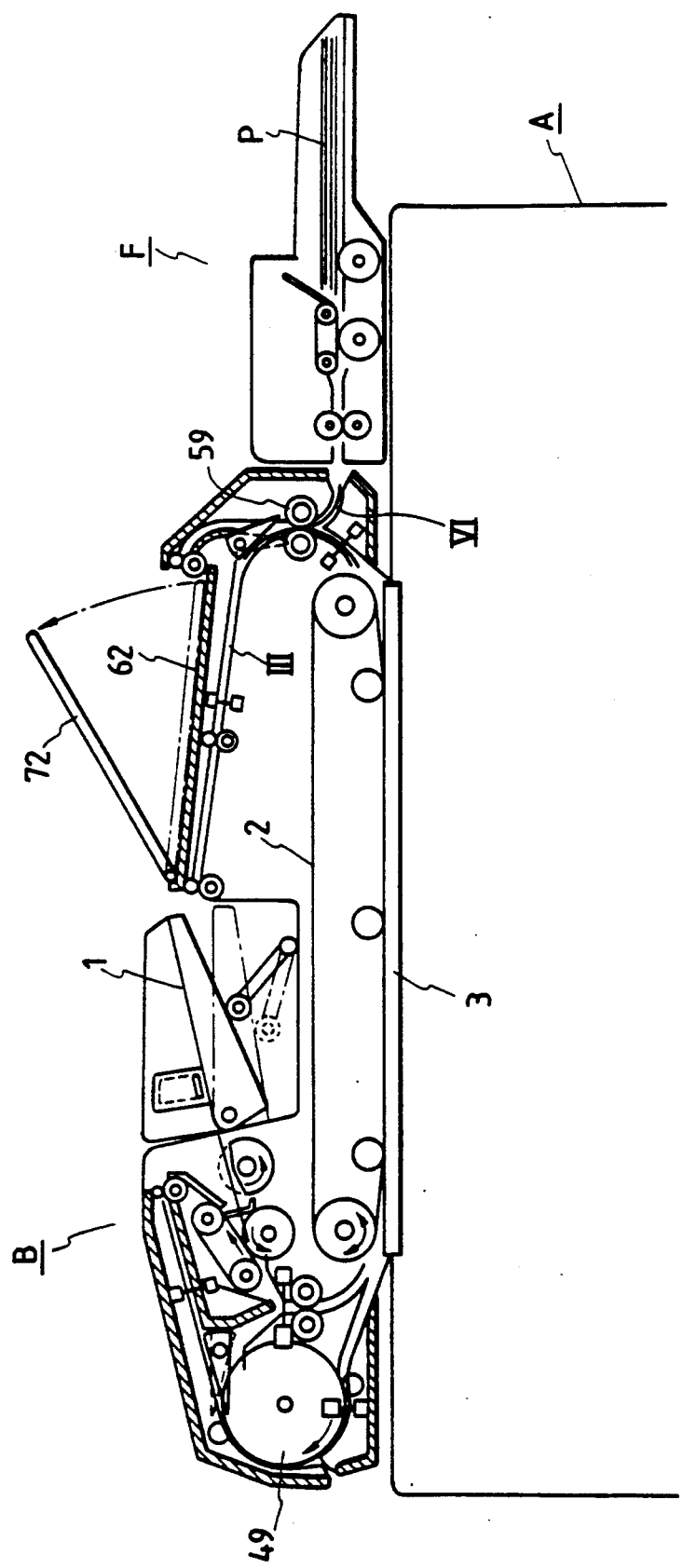
FIG. 13 is a sectional elevational view of the sheet original feeding apparatus to which an external sheet supply mechanism is connected.

FIG. 13 shows a sheet original feeding apparatus B to which another sheet original feeding apparatus F is connected. With this arrangement, the sheet original supplied from the sheet original feeding apparatus F can be conveyed into the second original ejecting path III through the original introducing path VI to feed the sheet original to the original tray 1. Accordingly, after the treated sheet original P has been fed into the second original ejector tray 62, by feeding the sheet original P supplied from the sheet original feeding apparatus F to the original tray 1 and by repeating the operations for re-starting the image treatment, it is possible to perform the image treatment regarding a large number of sheet originals P.

Further, if, while an operator is handling the RDF B, another operator sets as shown in FIG. 13 his sheet originals P to be treated in the sheet original feeding apparatus F, it is not necessary for him to wait there up to the completion of the treatment of the previous operator. In addition, since the image forming system can be operated continuously, the image treatments can be effectively and continuously performed and the sheet original feeding apparatuses can also be effectively driven.

RDF Control Means (100)

FIG. 8 is a block diagram showing the circuitry of a control means for the automatic circulating sheet original feeding apparatus according to the present invention. A control circuit 100 is constituted mainly by a one-chip microcomputer (CPU) 101 incorporating a ROM, RAM and the like therein, and signals from the various sensors are inputted to input ports I1 to I13 of the microcomputer 101.

Further, various loads are connected to output ports 01 to 015 of the microcomputer 101 through drivers D1 to D15, and the microcomputer 101 is communicated with the copying machine through a communication IC 102 to receive from and transmit to the later control data. The data sent from the RDF to the copying machine is a sheet supply completion signal indicating the completion of the supplying of the sheet original onto the platen.

A control sequence (control program) as shown in FIG. 9 is previously stored in the ROM, and various inputs and outputs are controlled on the basis of the control sequence.

Main Flow

Next, an operation of the copying machine incorporating the sheet original feeding apparatus will be explained with reference to a flow chart shown in FIG. 9 and to FIGS. 10 to 12.

Particularly, FIG. 9 shows a main flow chart associated with the copying machine, and various operations will be described in connection with this main flow chart hereinafter.

Single-surface Copy, Five Originals of A4 Size, Non-designation of Mixed Stacking, Plural Circulation Mode In a step S1, a tray UP treatment is effected to lift the original tray 1 up to the solid line position, so that the original tray is always lifted before the sheet originals are not stacked thereon to facilitate the operator's setting of the originals.

In a step S2, it is judged whether the originals are set or not by means of the inlet sensor 47, and the copying machine is driven by depressing a copy key of the operation portion (not shown) of the copying machine.

Then, in a step S4, the separation treatment (fully described later) is effected to supply one sheet original (lowermost original) from the bottom of the original stack.

Next, in a step S5, the sheet supply treatment (fully described later) is effected to feed the separated original onto the platen 3. When the sheet supply treatment is finished, the copying machine starts the copying operation (step S6) and the sequence goes to a step S7, where it is judged whether the partition lever is dropped (lowered) or not.

If affirmative, since it is means that the original is one, when the copying operation of the copying machine is finished (step S9), the switch-back sheet discharge treatment (fully described later) is effected (step S10), and then the original feeding control is finished.

In the step S7, if negative as the illustrated example, the flow of the feeding control is determined on the basis of the result of the detection of the original size performed during the sheet supply treatment in the step S5 and the result of the judgement whether the mixed stacking of the originals is designated in the operation portion of the copying machine (step S8). In case of the illustrated example, since the original has A4 size and the mixed stacking is not designated, in a step S11, the tray DOWN treatment is effected to lower the original tray to the phantom line position in FIG. 5, thus preparing to improve the registration of the ejected originals during the execution of the closed-loop sheet discharge treatment which will be fully described later.

Then, the separation treatment regarding the next original is effected (step S4'), and then the pre-sheet supply treatment (fully described later) is effected (step S13), and thereafter, when the copying operation of the copying machine is finished (step S9'), in a step S14, it is judged whether the switch-back circulation flag is set or not. In case of the illustrated example, since the negative was given in the step S8, the switch-back circulation flag is not set. The sequence goes to a step S15, where the closed-loop sheet discharge treatment (fully described later) is effected, and then the sheet supply treatment regarding a next original is effected (step S5').

When the sheet supply treatment is finished, the copying machine starts the copying operation (step S6'), and it is judged whether the partition lever is lowered during the copying operation (step S8'); if negative, the sequence returns to the step S4' to further continue the treatment.

If affirmative is given in a step S7", since it is means that the original is a last original, when the copying operation of the copying machine is finished (step S9"). it is judged whether the switch-back sheet discharge flag is set or not (step S14'). In the illustrated example, since the negative is given as mentioned above, the sequence goes to a step S15' where the closed-loop sheet discharge treatment is initiated, and thereafter the waiting condition is maintained until the sheet discharge treatments regarding all originals are finished (step S16).

Next, it is judged whether the circulation is a last circulation or not (step S17); if the last circulation is judged, the tray UP treatment is effected to lift the original tray 1 up to the solid line position in FIG. 5, thereby returning the tray to the initial condition (step S1'), and then the original feeding control is finished. In the step S17, if the negative is given, it is judged whether the number of the originals is four or less (step S18); if affirmative, the switch-back circulation flag is set (step S19), and the sequence returns to the separation treatment in the step S4; whereas, if negative, the sequence returns to the step S4 without going to the step S19. This is the reason why the optimum control is effected on the basis of the number of the originals.

Single-surface Copy, Five Originals of A3 Size, Non-designation of Mixed Stacking, Plural Circulation Mode In the step S1, the tray UP treatment is effected to lift the original tray 1 up to the solid line position, so that the original tray is always lifted before the sheet originals are not stacked thereon to facilitate the operator's setting of the originals.

In the step S2, it is judged whether the originals are set or not by means of the inlet sensor 47, and the copying machine is driven by depressing the copy key of the operation portion (not shown) of the copying machine A.

Then, in the step S4, the separation treatment (fully described later) is effected to supply one sheet original (lowermost original) from the bottom of the original stack.

Next, in the step S5, the sheet supply treatment (fully described later) is effected to feed the separated original onto the platen 3. When the sheet supply treatment is finished, the copying machine A starts the copying operation (step S6) and the sequence goes to the step S7, where it is judged whether the partition lever 120 is dropped or not. If affirmative, since it is means that the original is one, when the copying operation of the copying machine A is finished (step S9), the switch-back sheet discharge treatment (fully described later) is effected, and then the original feeding control is finished.

In the step S7, if the negative is given, the flow of the feeding control is determined on the basis of the result of the detection of the original size performed during the sheet supply treatment in the step S5 and the result of the judgement whether the mixed stacking of the originals is designated in the operation portion of the copying machine A (step S8). In case of the illustrated example, since the original has A3 size and the mixed stacking is not designated, in a step S12, the switch-back circulation flag is set.

Then, the separation treatment regarding the next original is effected (step S4'), and then the pre-sheet supply treatment (fully described later) is effected (step S13), and thereafter, when the copying operation of the copying machine is finished (step S9'), in the step S14, it is judged whether the switch-back circulation flag is set or not. In case of the illustrated example, since the affirmative was given in the step S8, the switch-back circulation flag is set. The closed-loop sheet discharge treatment (fully described later) is effected (step S15), and then the sheet supply treatment regarding a next original is effected (step S5'). When the sheet supply treatment is finished, the copying machine starts the copying operation (step S6'), and it is judged whether the partition lever is lowered during the copying operation (step S7"); if negative, the sequence returns to the step S4' to further continue the treatment.

If affirmative is given in a step S7", since it is means that the original is a last original, when the copying operation of the copying machine is finished (step S9"), it is judged whether the switch-back sheet discharge flag is set or not (step S14'). In the illustrated example, since the affirmative is given as mentioned above, the sequence goes to a step S10" where the switch-back sheet discharge treatment is initiated, and thereafter the waiting condition is maintained until the sheet discharge treatments regarding all originals are finished (step S16).

Next, it is judged whether the circulation is a last circulation or not (step S17); if the last circulation is judged, the tray UP treatment is effected to lift the original tray 1 up to the solid line position in FIG. 5, thereby returning the tray to the initial condition (step S1'), and then the original feeding control is finished. In the step S17, if the negative is given, it is judged whether the number of the originals is four or less (step S18); if affirmative, the switch-back circulation flag is set (step S19), and the sequence returns to the separation treatment in the step S4; whereas, if negative, the sequence returns to the step S4 without going to the step S19. This is the reason why the optimum control is effected on the basis of the number of the originals.

Single-surface Copy, Five Originals of A4 Size, Five Originals of A3 Size, Designation of Mixed Stacking, Plural Circulation Mode In the step S1, the tray UP treatment is effected to lift the original tray 1 up to the solid line position in FIG. 5, so that the original tray is always lifted before the sheet originals are not stacked thereon to facilitate the operator's setting of the originals.

In the step S2, it is judged whether the originals are set or not by means of the inlet sensor 47, and the copying machine is driven by depressing the copy key of the operation portion (not shown) of the copying machine.

Then, in the step S4, the separation treatment (fully described later) is effected to supply one sheet original (lowermost original) from the bottom of the original stack.

Next, in the S5, the sheet supply treatment (fully described later) is effected to feed the separated original onto the platen 3.

When the sheet supply treatment is finished, the copying machine starts the copying operation (step S6) and the sequence goes to the step S7, where it is judged whether the partition lever 120 is dropped or not. If affirmative, since it is means that the original is one, when the copying operation of the copying machine is finished (step S9), the switch-back sheet discharge treatment (fully described later) is effected, and then the original feeding control is finished.

In the step S7, if the negative is given, the flow of the feeding control is determined on the basis of the result of the detection of the original size performed during the sheet supply treatment in the step S5 and the result of the judgement whether the mixed stacking of the originals is designated in the operation portion of the copying machine A (step S8). In case of the illustrated example, since the original has A4 size and the mixed stacking is designated, in a step S12, the switch-back circulation flag is set.

Then, the separation treatment regarding the next original is effected (step S4'), and then the pre-sheet supply treatment (fully described later) is effected (step S13), and thereafter, when the copying operation of the copying machine A is finished (step S9'), in the step S14, it is judged whether switch-back circulation flag is set or not. In case of the illustrated example, since the affirmative was given in the step S8, the switch-back circulation flag is set. The closed-loop sheet discharge treatment (fully described later) is effected (step S15), and then the sheet supply treatment regarding a next original is effected (step S5').

When the sheet supply treatment is finished, the copying machine starts the copying operation (step S6'), and it is judged whether the partition lever is dropped during the copying operation (step S7"); if negative, the sequence returns to the step S4' to further continue the treatment.

If affirmative is given in a step S7", since it is means that the original is a last original, when the copying operation of the copying machine is finished (step S9"), it is judged whether the switch-back sheet discharge flag is set or not (step S14'). In the illustrated example, since the affirmative is given as mentioned above, the sequence goes to a step S10" where the switch-back sheet discharge treatment is initiated, and thereafter the waiting condition is maintained until the sheet discharge treatments regarding all originals are finished (step S16).

Next, it is judged whether the circulation is a last circulation or not (step S17); if the last circulation is judged, the tray UP treatment is effected to lift the original tray 1 up to the solid line position in FIG. 5, thereby returning the tray to the initial condition (step S1'), and then the original feeding control is finished. In the step S17, if the negative is given, it is judged whether the number of the originals is four or less (step S18); if affirmative, the switch-back circulation flag is set (step S19), and the sequence returns to the separation treatment in the step S4; whereas, if negative, the sequence returns to the step S4 without going to the step S19. This is the reason why the optimum control is effected on the basis of the number of the originals. In the illustrated example, different controls are effected in accordance with the fact that the number of originals is less than four or much more five. If the number of originals is less than four, even when the originals each having A4 size are used, the switch-back mode is utilized, because the switch-back mode permits higher speed treatment than the closed-loop mode, that is to say, the closed-loop mode gives the slow treatment speed since four originals are in the paths.

Separation Treatment

The separation treatment effected in the step S4 in the flow chart of FIG. 9 will be described with reference to FIG. 10A.

In the separation treatment (step S4), if the original is a first original (step S4-1), the partition member motor 39 is turned ON to drive the partition member 40 for detecting the boundary of the original stacks P, and the separation motor 81 is turned ON to deal with the original stack P (step S4-3) and at the same time the jogging treatment (fully described later) is started to perform the lateral registration of the original stack P (step S4-5).

Thereafter, when the jogging treatment is finished (step S4-7), the stopper solenoid 36 is turned ON to lower the sheet supply stopper 7 for permitting the separation of a single sheet original from the bottom of the original stack P (step S4-9). When the original advances in the original feeding path I and the regist sensor 52 detects the leading end of the original (step S4-11), the speed control is effected to reduce the speed of the separation motor 81 and a separation loop timer is initiated (step S4-13). After the time set by the timer has been elapsed (step S4-15), the separation motor 81 is turned OFF (step S4-17), with the result that, since the original is abutted against the nip between the paired feeding rollers 51 at a low speed, the leading end of the original is prevented from being damaged and the original is stopped in a condition that a predetermined amount of loop is formed in the original, whereby any skew-feed of the original is corrected.

Sheet Supply Treatment

The sheet supply treatment effected in the step S5 in the flow chart of FIG. 9 will now be described with reference to FIG. 10B.

In the sheet supply treatment (step S5), a pair of sheet supply rollers 18 and the wide belt 2 are driven. The belt motor 82 is normally turned ON to feed the original from the original feeding path I to the first original ejecting path II (step S5-1) and at the same time a size check counter for counting clock signals inputted from a belt clock interrupter is activated (step S5-2), thereby initiating the measurement of the original size and the regist treatment (fully described later) (step S5-3).

Immediately after the leading end of the fed original has passed through the sheet supply sensor 52 (step S5-4), the size check counter is stopped (step S5-5). On the basis of the data from the counter, the original size is determined in a size check routine shown in FIG. 10J (step S5-6). Further, at the time when the regist treatment is finished, the sheet supply treatment is ended (step S5-7).

Pre-sheet Supply Treatment

The pre-sheet supply treatment effected in the step S13 in the flow chart of FIG. 9 will now be described with reference to FIG. 10C.

First of all, the separation clutch 86 is turned ON (step S13-1) to connect the separating portion to the regist rollers, thereby permitting the operation of the feed roller 41, separating belt 42 and the pair of feeding rollers 51. Then, the separation motor 81 is turned ON and at the same time a pre-sheet supply timer is started (step S13-2, S13-3). The pre-sheet supply timer is so set that, by driving the separation motor 81 by a time set by this timer, the original A is advanced by 30 mm far from the nip between the feeding rollers 51 (toward a reference position for exposure), as shown in FIG. 11A. When the pre-sheet supply timer is finished (step S13-5), the separation motor 81 is turned OFF (step S13-6) and the pre-sheet supply treatment is ended (step S13-7).

Switch-back Sheet Discharge Treatment

The switch-back sheet discharge treatment effected in the step S10 in the flow chart of FIG. 9 will now be described with reference to FIG. 10D.

In the switch-back sheet discharge treatment (step S10), the belt motor 82 is reversely turned ON (step S10-1) to discharge the original on the platen 3. When the leading end of the original is detected by the first sheet discharge sensor 55 (step S10-2), the reverse motor 87 is turned ON (step S10-3).

Accordingly, the original is conveyed into the sheet path II. When the trailing end of the original is detected by the first sheet discharge sensor 55 (step S10-4), a feed counter FC1 for governing the timing of the start of the speed control for the reverse motor 87 is started (step S10-5) to effect the registration of the discharged original. After the count of the feed counter FC1 is finished, while the further speed control is being effected, a counter FC2 for determining a distance for discharge the original onto the original tray 1 is started (step S10-7). The speed control is continued until the counter FC2 is finished (step S10-8), and, when the feed counter FC2 is finished (step S10-9), the reverse motor 87 is turned OFF (step S10-10), and the sequence is in a waiting condition until the original is dropped on the original tray 1.

An original down timer ORG-DWN-TM is started (step S10-11). After the timer ORG-DWN-TM is finished (step S10-12), the jogging solenoid 132 is turned ON to urge the jogging guide 122 for performing the registration of the discharged original and at the same time a timer EJCT-JOG-TM for determining the urging time is started (step S10-15). After the timer EJCT-JOG-TM is finished (step S10-17), the jogging solenoid 132 is turned OFF (step S10-19) and the switch-back sheet discharge treatment is ended.

Closed-loop Sheet Discharge Treatment

The closed-loop sheet discharge treatment effected in the step S15 in the flow chart of FIG. 9 will now be described with reference to FIG. 10E.

Figure 12A:
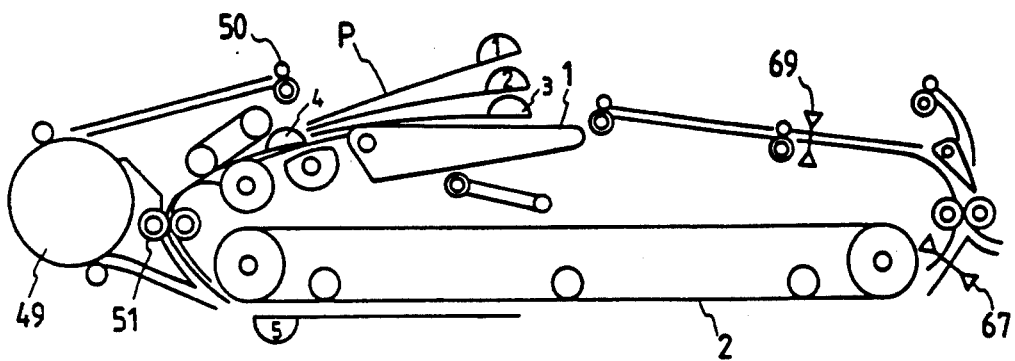
FIGS. 12A to 12H are schematic elevational view of the sheet original feeding apparatus for explaining a sheet feeding operation.

At a time when the closed-loop sheet discharge treatment is started, the condition of the original P is shown in FIG. 12A. Now, a waiting condition is kept until the second sheet discharge sensor 67 detects the leading end of the original ⑤ (step S15-1). However, in this case, in the closed-loop sheet discharge treatment, the wide belt 2 is not driven.

Figure 12B:
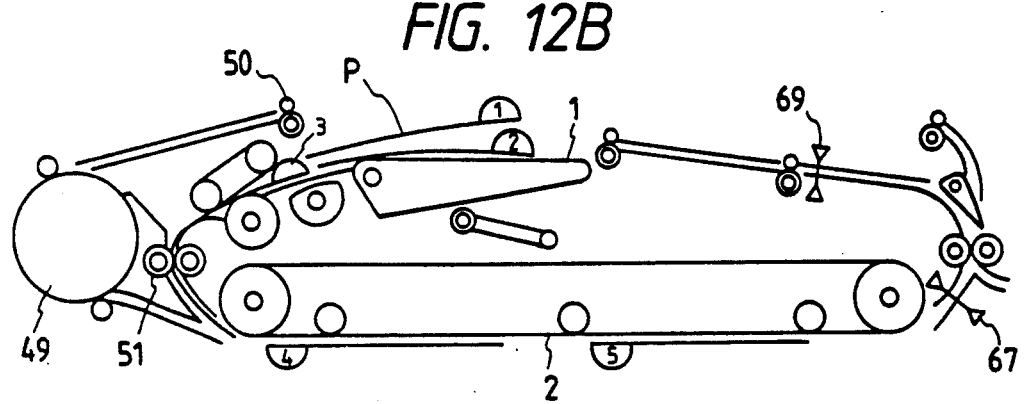
Figure 12C:
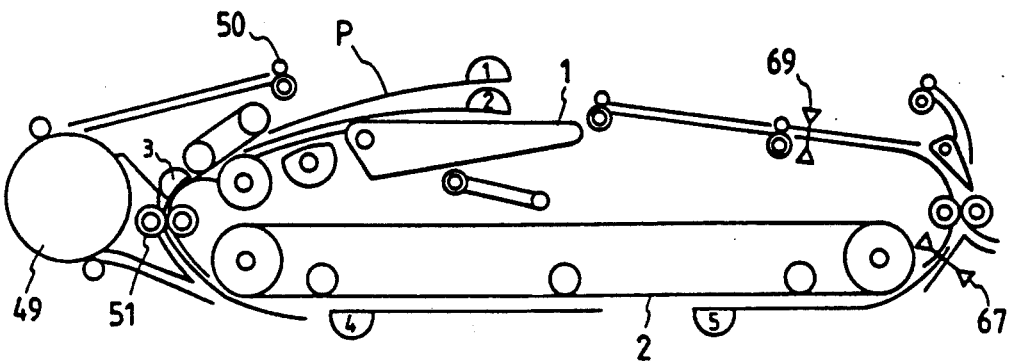
Figure 12D:
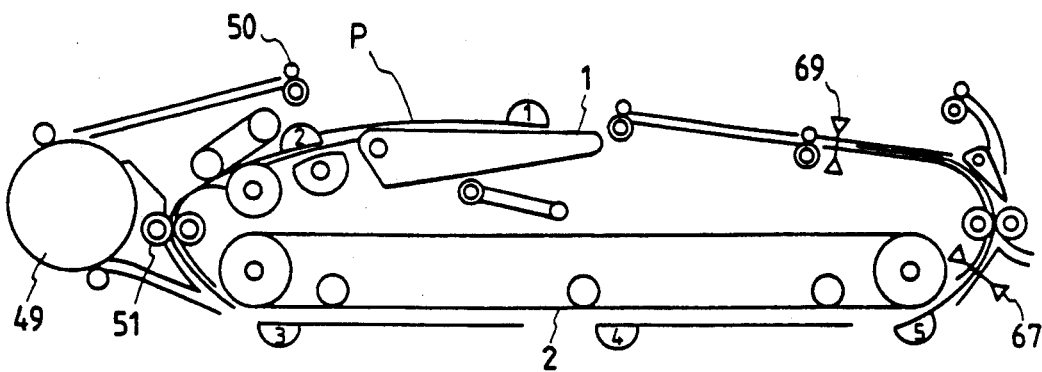

Now, in the steps S4 and S5', the separating treatment, pre-sheet supply treatment and sheet supply treatment regarding the next original ④ are effected, with the result that the relation between the originals becomes as shown in FIG. 12B. Further, the closed-loop sheet discharge of the next original ④ is effected. Further, after the separation treatment and pre-sheet supply treatment of the third original ③ are effected, during the sheet supply treatment of this original ③, as shown in FIG. 12C. after the leading end of the first original ⑤ is detected by the second sheet discharge sensor 67, a waiting condition is kept until the leading end of the first original is detected by the third sheet discharge sensor 69 (step S15-3). Further, at a time when the sheet supply treatment of the third original ③ is finished, the relation between the originals becomes as shown in FIG. 12D.

Figure 12E:
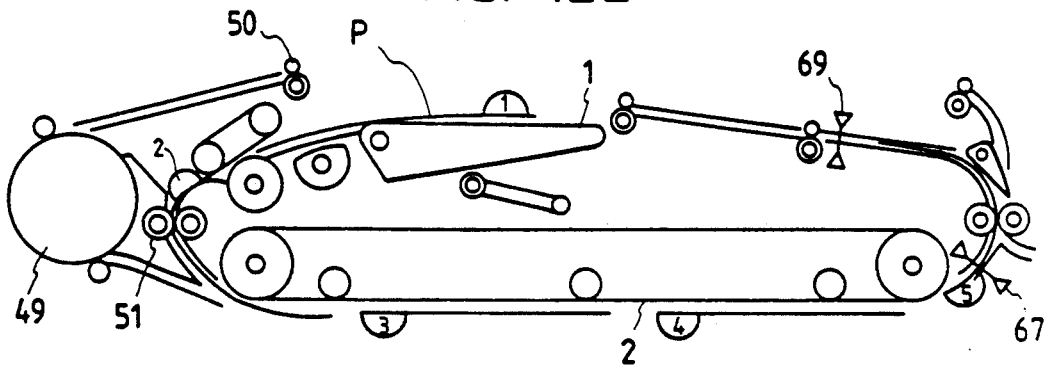

Further, after the separation treatment and pre-sheet supply treatment regarding the fourth original ② are effected, during the sheet supply treatment of this original ②, as shown in FIG. 12E, when the leading end of the first original ⑤ is detected by the third sheet discharge sensor 69, the sheet discharge motor 89 is turned ON (step S15-5) to start the ejection of the original ⑤ by means of the second sheet conveying roller 60, and it is judged whether the original is the first original or not (step S15-6). If affirmative, the partition member motor 39 is turned ON (step S16-6') to prevent the ejected original from slipping in the partition member. After the trailing end of the original is detected by the third sheet discharge sensor 69 (step S15-7), if the partition member motor 39 is being driven, this motor is stopped (step S15-8).

Figure 12F:
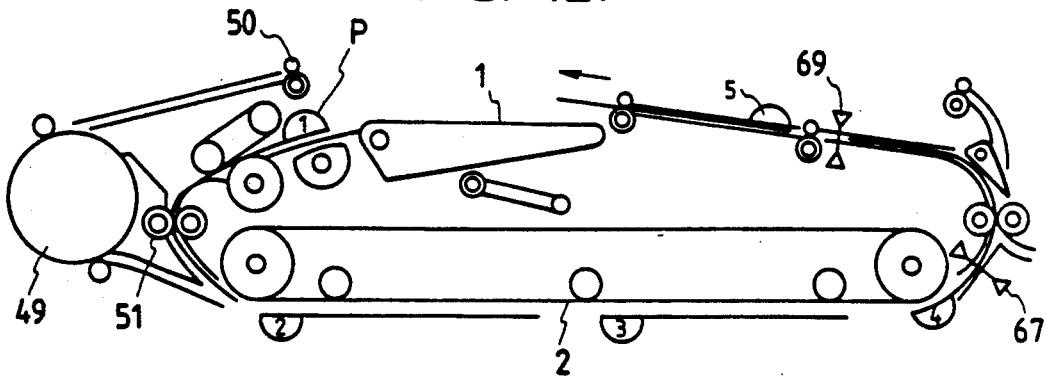
Figure 12G:
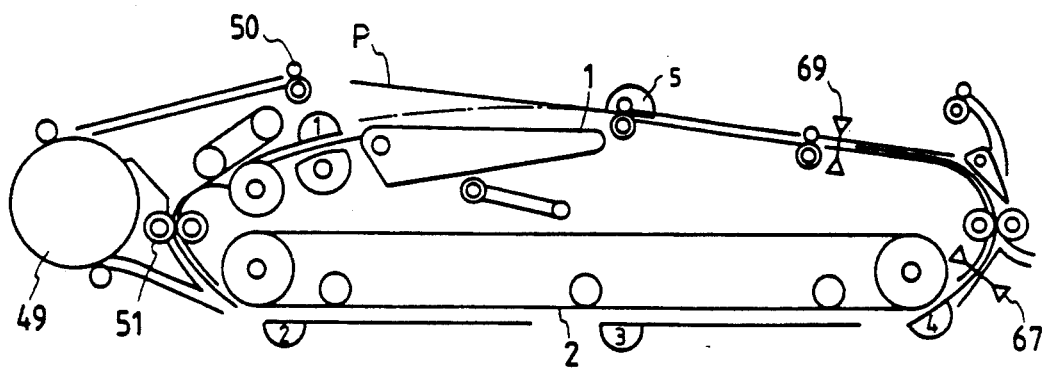
Figure 12H:
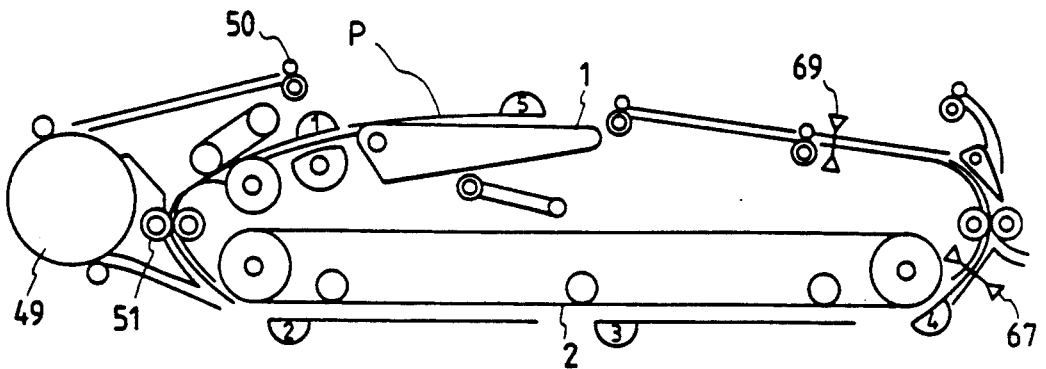

Thereafter, as shown in FIG. 12F, even after the sheet supply treatment of the fifth original ① has finished and the wide belt 2 has been stopped, the first original ⑤ continues to be ejected by the second sheet conveying roller 60 in a direction shown by the arrow. When the third sheet discharge sensor 69 detects the trailing end of the first original ⑤, a closed-loop sheet discharge counter 1 is started by a time corresponding to a distance between the third sheet discharge sensor 69 and a point ahead of the center of the nip of the third feed rollers 61 by 10 mm (step S15-9). At the same time, until the closed-loop sheet discharge counter 1 is finished, the sheet discharge speed is slowed down (step S15-11). When the closed-loop sheet discharge counter 1 is finished (step S15-13), the sheet discharge motor 89 is stopped (step S15-15), a closed-loop sheet discharge drop timer is started by a time corresponding to a time when the leading end of the first original ⑤ is dropped from the solid line position shown in FIG. 12G to the phantom line position (step S15-17).

When the closed-loop sheet discharge drop timer is finished (step S15-19), the sheet discharge motor 89 is turned ON (step S15-19) and a closed-loop sheet discharge counter 2 is started by a time corresponding to a distance that the first original ⑤ is completely separated from the third feed rollers 61 (step S15-23). When the closed-loop sheet discharge counter 2 is finished (step S15-25), the sheet discharge motor 89 is stopped (step S15-27). After the original ⑤ is reaches the position shown in FIG. 12H, a closed-loop sheet discharge drop timer LOOP-DWN-TM for providing an interval until the original is dropped onto the original tray 1 is started (step S15-29). After the timer is finished (step S15-31), the jogging solenoid 312 is turned ON (step S15-33) to urge the jogging guide 122 for the registration of the ejected original, and a timer LOOP-JOG-TM for determining the urging time is started (step S15-35). After the timer is finished (step S15-37), the jogging solenoid 132 is turned OFF (step S15-39), and the closed-loop sheet discharge treatment is ended. In this case, a feeding amount of the original on the basis of the closed-loop sheet discharge counter exactly coincides with a feeding amount by means of the second and third rollers 60, 61.

Tray UP Treatment

Figure 10A:
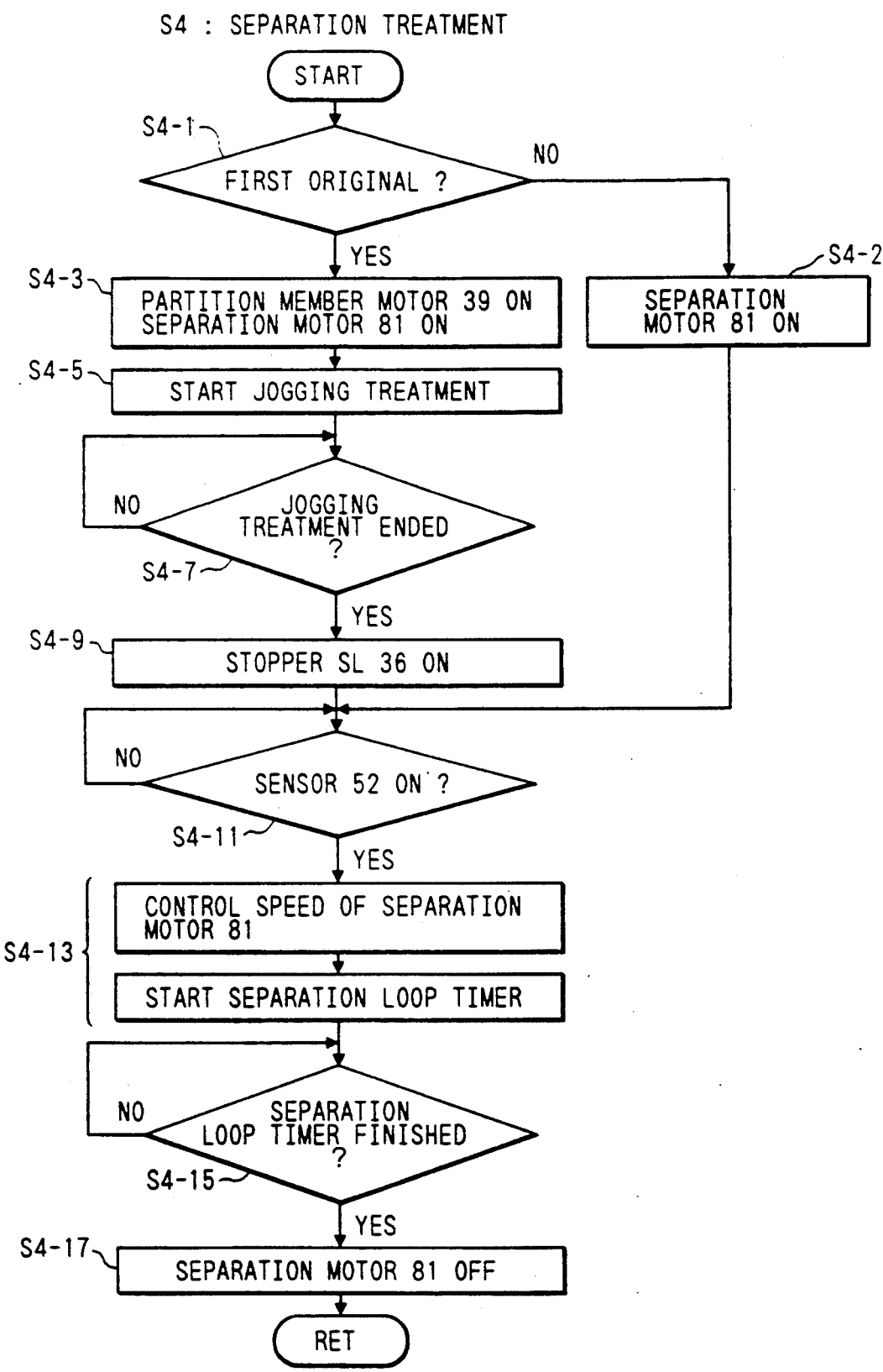
Figure 10B:
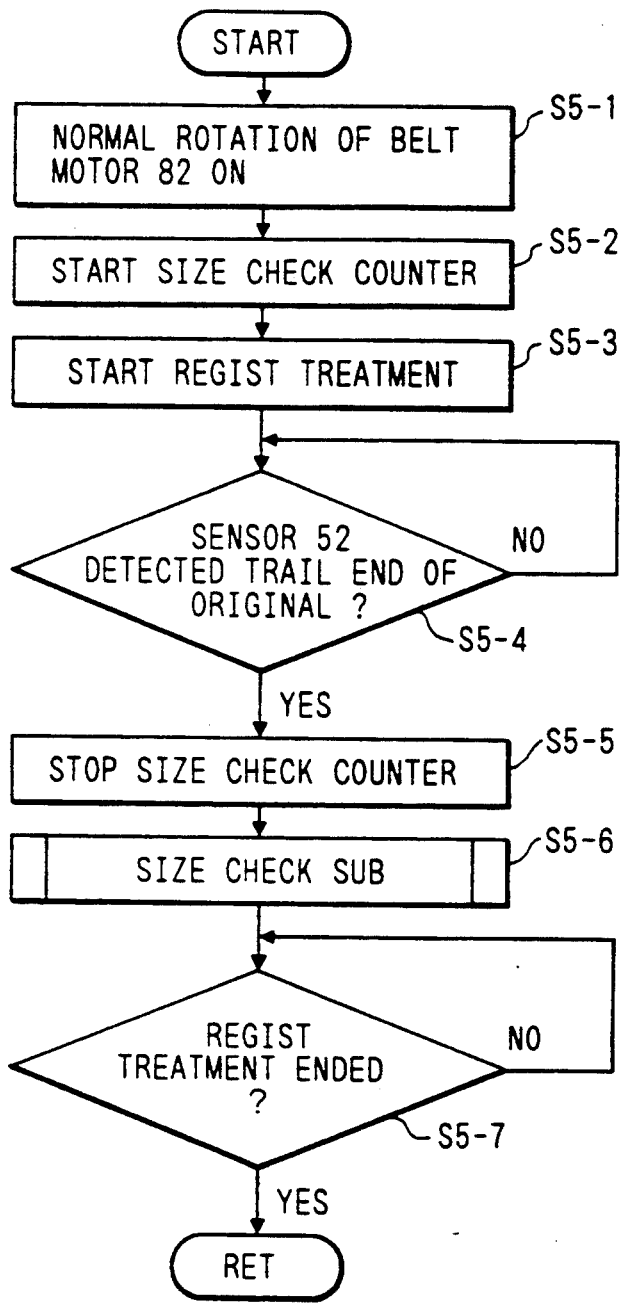
Figures 2, 10D:
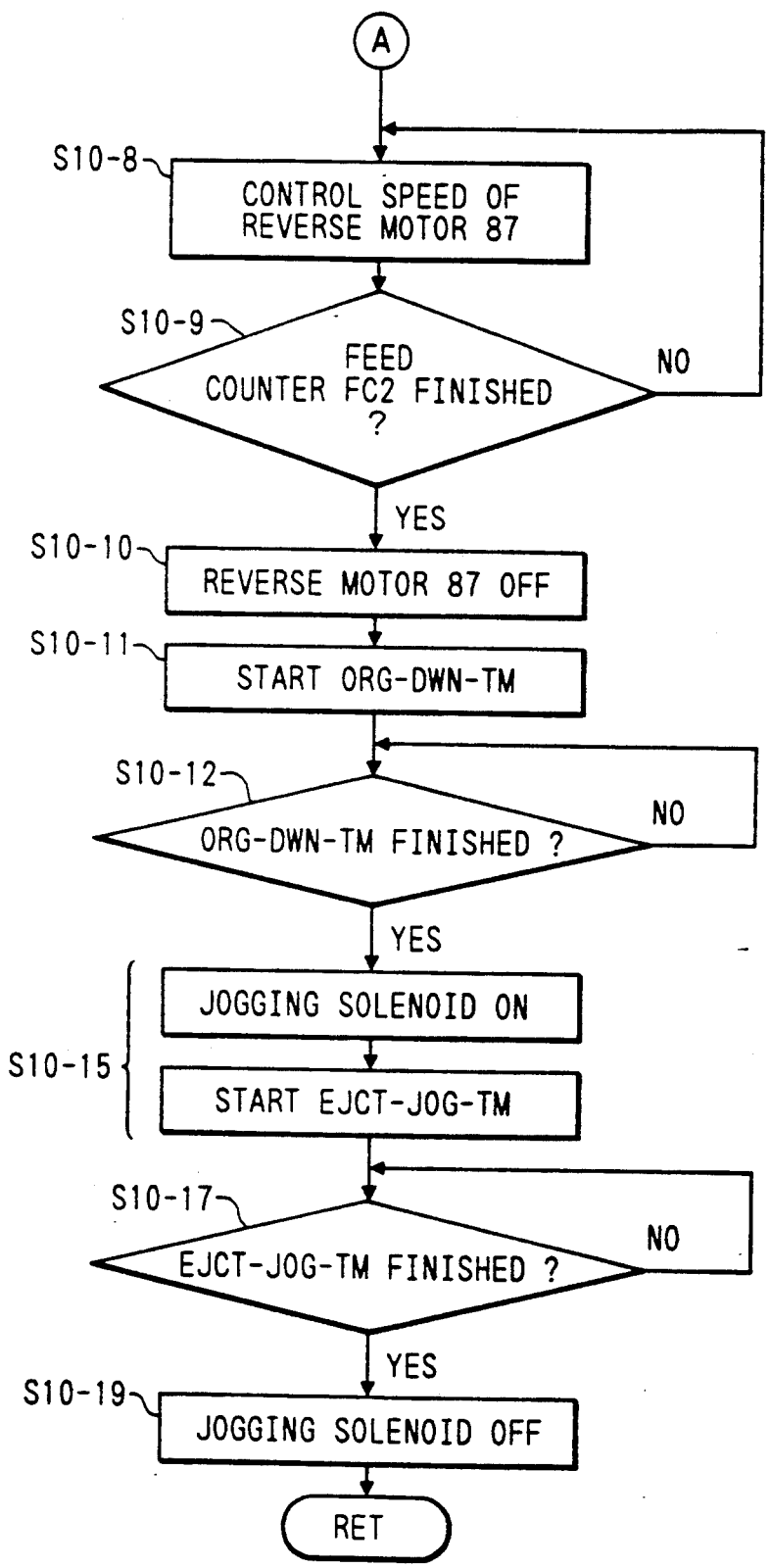
Figures 2, 10E:
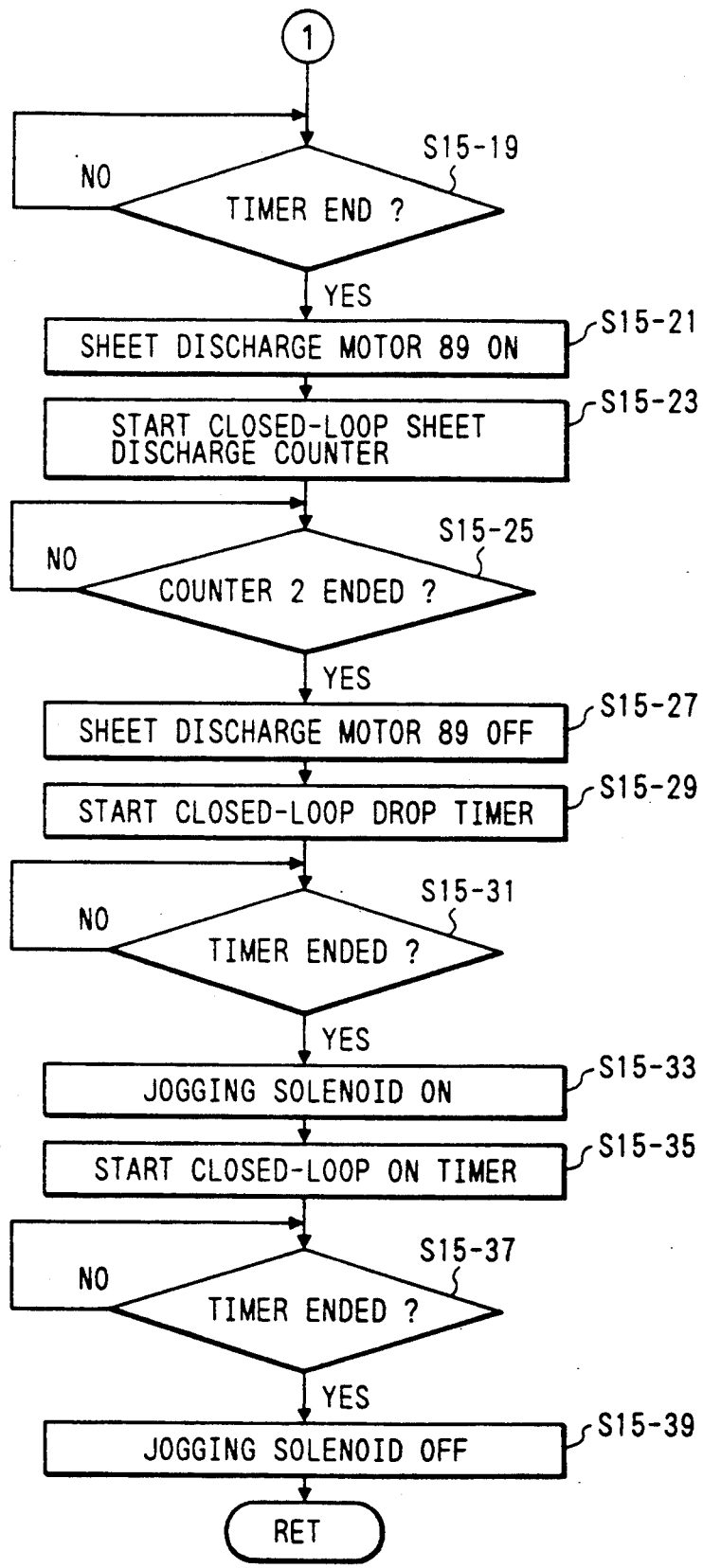
Figure 10F:
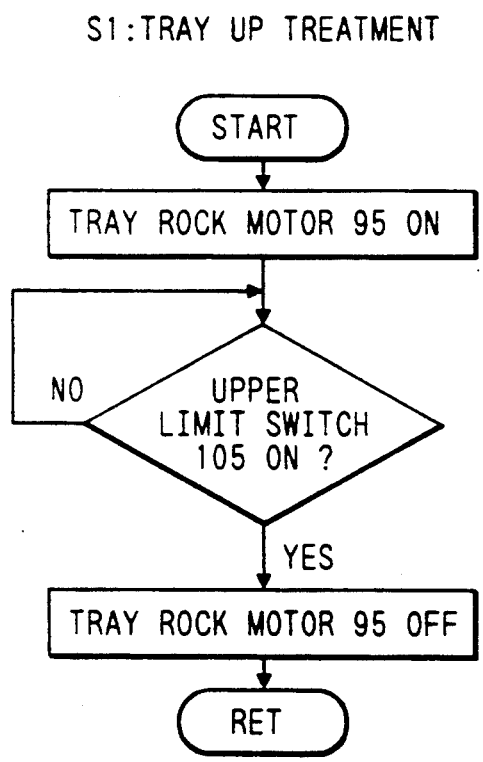

The tray UP treatment effected by the RDF will now be described with reference to FIG. 10F.

In order to lift the original tray 1 up to the solid line position shown in FIG. 5, the tray rock motor 95 is driven until an upper limit switch 105 is turned ON. When the upper limit switch 105 is turned ON, the tray rock motor 95 is stopped.

Tray DOWN Treatment

Figure 10G:
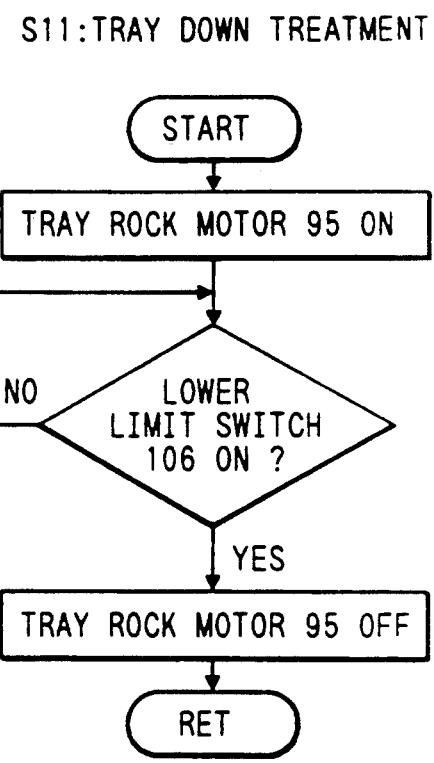

The tray DOWN treatment effected by the RDF will now be described with reference to FIG. 10G.

In order to lower the original tray 1 up to the phantom line position shown in FIG. 5, the tray rock motor 95 is driven until a lower limit switch 109 is turned ON. When the lower limit switch 109 is turned ON, the tray rock motor 95 is stopped.

Jogging Treatment

Figure 10H:
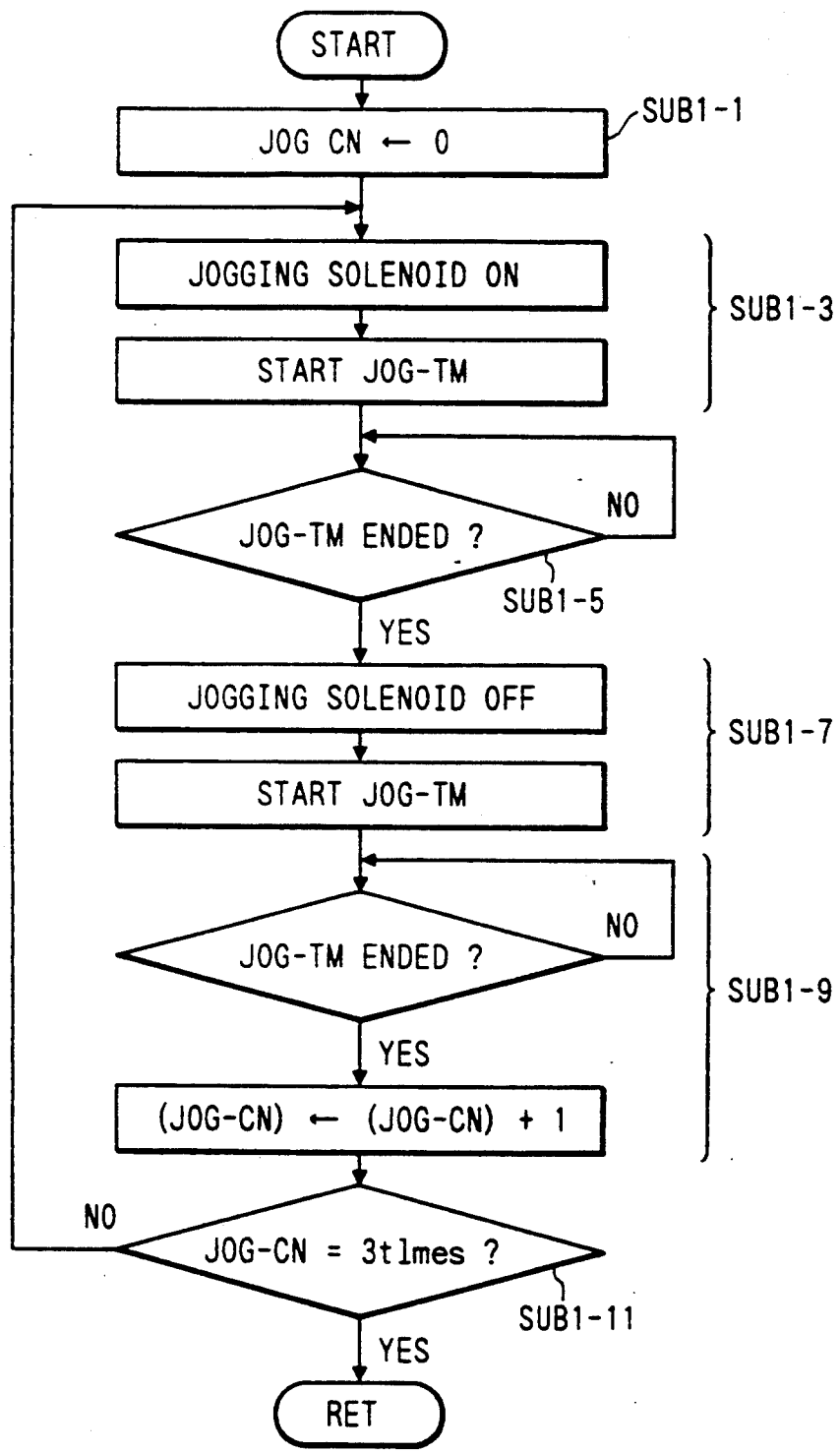

The sequence of the jogging treatment will now be described with reference to a flow chart shown in FIG. 10H.

In the jogging treatment (SUB1), first of all, a jogging counter JOG-CN for determining the number of the jogging operations is initialized (SUB1-1), and the jogging solenoid 132 for urging the jogging guide 122 of the width regulating members is turned ON and a timer JOG-TM which can be voluntarily set is started (SUB1-3). The set time of the timer JOG-TM is elapsed (SUB1-5), the jogging solenoid 132 is turned OFF to return the jogging guide to the initial position and the timer JOG-TN is started (SUB1-7). The set time of the timer is elapsed, the number of the jogging operation is increased (SUB1-9), and the sequence returns to the step SUB1-3 and the treatments are repeated until the reciprocal movements of the jogging guide 122 are finished by three times (SUB1-11). In this way, the original stack P is registrated in the lateral direction, thus preventing the skew-feed and lateral regist of the original.

Regist Treatment

The regist treatment will now be described with reference to FIG. 10I.

First of all, when the trailing end of the original is detected by the sheet supply sensor 52 (SUB2-1), a regist counter RGCN for stopping the original at a predetermined position on the platen 3 is started (SUB2-3). The regist counter RGCN is counted by a belt clock interrupter so that the feeding amount of the original coincides with the counted value without fail.

Then, in order to stop the original at the predetermined position on the platen 3 with high accuracy, the speed control of the belt motor 82 in a low speed is effected. The speed control is continued until the regist counter RGCN is finished (SUB2-4). When the regist counter is finished, the belt motor 82 is turned OFF (SUB2-5), and then an electromagnetic brake is turned ON (SUB2-6) to stop the original at the predetermined position.

Size Check Treatment

Figure 10J:
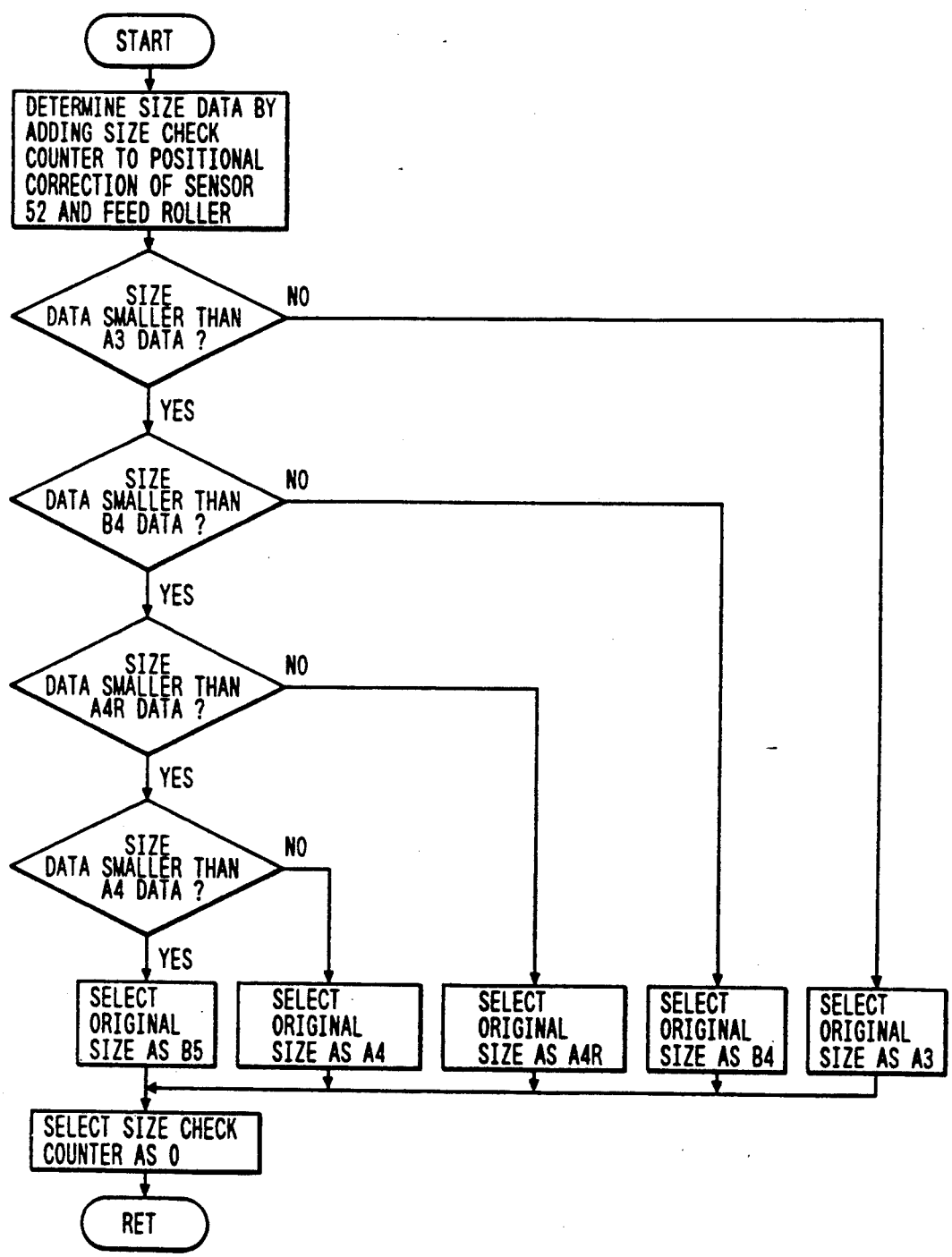

The size check sub-routine will now be described with reference to FIG. 10J.

In the size check sub-routine, the data from the size check counter acting as the means for determining the size of the original is added to the positional correction regarding a distance between the nip position of the feeding rollers 51 and the sheet supply sensor 52, thus obtaining the true size of the original. In this case, the original is being fed by the feeding rollers 51 and the wide belt 2, and the feeding amount by these elements coincides with the counted value by means of the belt clock interrupter without fail. Thereafter, on the basis of the corrected data, the size of the original such as B5, A4, A4R, B4, A3 and the like is determined.

Figure 14:
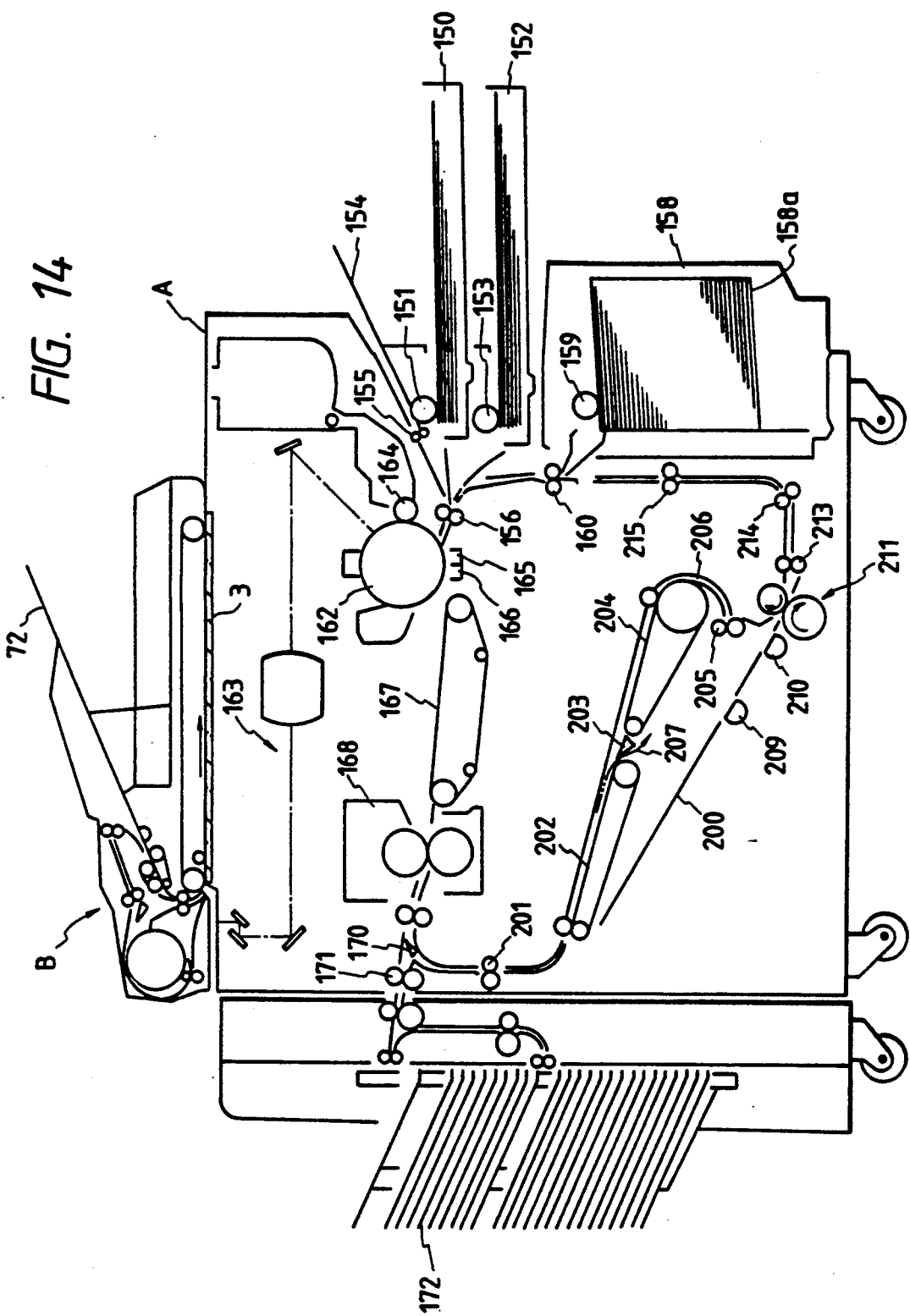
FIG. 14 is a sectional elevational view of the whole image forming system.

Next, the whole image forming system will be explained with reference to FIG. 14.

The reference numeral 150 denotes an upper cassette, and sheets in this cassette are separated and supplied one by one by means of a separating claw and a supply roller 151 and each sheet is directed to regist rollers 156. The reference numeral 152 denotes a lower cassette, and sheets in this cassette are separated and supplied one by one by means of a separating claw and a supply roller 153 and each sheet is directed to regist rollers 156. The reference numeral 154 denotes a manual insert guide from which a sheet is directed to the regist rollers 156 through rollers 155. The reference numeral 158 denotes a sheet stacking means (deck type) having an intermediate plate 158a lifted and lowered by means of a motor and the like, and sheets rested on the intermediate plate are separated and fed by supply rollers 159 and a separating claw and each sheet is directed to conveying rollers 160.

The reference numeral 162 denotes a photosensitive drum; 163 denotes an optical reading system; 164 denotes a developing device; 165 denotes a transfer charger; and 166 denotes a separating charger, these elements constituting an image forming portion.

The reference numeral 167 denotes a conveying belt for conveying the sheet on which an image was formed; 168 denotes a fixing device; 169 denotes conveying rollers; and 170 denotes a flapper. The sheet on which the image was formed is directed to sheet discharge rollers 171 by means of the flapper 170 and then is discharged into a sorter 172. The sorter 172 has a non-sort tray 172a, sort bin tray 172b, non-sort tray ejector rollers 172c, and sort bin ejector rollers 173d. By lifting and lowering the non-sort tray and the sort bin tray, the sheet is sorted one stage by one stage. Incidentally, in place of the sorter, an ejector tray may be used.

An original is positioned on the platen 3 by an automatic original feeding apparatus B and is read by the optical reading system. Incidentally, the reference numeral 2 denotes a conveying belt which can convey the original onto the platen when normally (arrow A) rotated and eject the original from the platen when reversely rotated.

Regarding one original positioned on the platen, in accordance with the number of copies set, an images are formed on the photosensitive drum and the sheets corresponding to the number of copies are fed from either cassette 150, 152 or deck 158 one by one whenever the image is formed on the photosensitive drum. The positional registration between the image formed on the photosensitive drum and the sheet is performed by the regist rollers 156.

A required number of copies are formed, the original is ejected from the platen, and a next original is positioned on the platen. Thereafter, the same operation as mentioned above is repeated.

The reference numeral 200 denotes an intermediate tray on which the imaged sheets are once stored when the images are formed on both surfaces of each sheet (double-surface copy mode) or when the images are superimposed on a single surface of each sheet (multi-print copy mode). The reference numeral 201 denotes conveying rollers; 202 denotes a conveying belt; 203 denotes a flapper; 204 denotes a conveying belt; and 205 denotes conveying rollers. In case of the double-surface copy mode, the sheet is directed to the intermediate tray 200 through a path 206 with the imaged surface thereof turned upside. In case of the multi-print copy mode, the sheet is directed to the intermediate tray 200 through a path 207 with the imaged surface thereof turned downside.

The sheets stacked on the intermediate tray are separated one by one from the bottom of the sheet stack by means of auxiliary rollers 209, 210 and a pair of reversible separating rollers 211, and each separated sheet is re-fed. The re-fed sheet is directed to the image forming portion by means of conveying rollers 213, 214, 215, rollers 160 and regist rollers 156. After the image is formed on the sheet, the latter is ejected in the same manner as mentioned above.

Regarding one original positioned on the platen, in accordance with the number of copies set, first of all, the single-surface copy operations are performed as to each sheet, and the sheet are stored or stacked on the intermediate tray 200. Thereafter, the original is ejected from the platen and the surface of the original is turned over, and then the same original is re-positioned on the platen. Then, the image on the original is read by times corresponding to the required number of copies. The read image is formed on the sheet re-fed from the intermediate tray 200 whenever the reading of the image is effected. The sheets on which the images were formed are sorted by the sorted 172 in page order.

On the other hand, there is a method wherein one set of copies is formed by using the automatic original feeding apparatus. According to this method, even when it is desired to obtain a plurality of copies, since the copy groups with page order can be obtained successively, the required number of the sorted copies can be obtained without the sorter. When the double-surface copy is effected by using this method, the images on both surfaces of each original is successively read and the images are successively formed on both surfaces of each sheet, and then the original is ejected. Thereafter, by repeating the same operations regarding both surfaces of other originals, the sorted copy groups can be obtained.

In the above explanation of the present invention, while the large size of the original was A3, B4 and the small size of the original was A4, B5, the size of the original is not limited to the above. Further, while an example that the closed-loop mode is used in case of the original of A3 size and the switch-back mode is used in case of the original of A4 size was explained, the closed-loop mode may be used even in case of the original of B5 size, and the switch-back mode may be used even in case of the original of B4 size.

Further, the closed-loop mode may be used only in the case of the original of A4 size and the switch-back mode may be used in case of the originals having other sizes. Further, the closed-loop mode may be used only in the case of the original of B5 size or only in the case of the original of A3 size or only in the case of the original of B4 size. It is effective that the closed-loop mode is used regarding the original size which is frequently used.

In the illustrated embodiment, since the length of the original tray is selected in accordance with the original of A4 size, it is preferable that the closed-loop mode is used only in case of the original of A4 size. That is to say, in this case, since the trailing ends of the originals rested on the original tray positioned substantially in a horizontal condition are positioned below and near the rollers 61, the leading end of the next original does not strike against the original stack.

What is claimed is:

1. A sheet original feeding apparatus, comprising:
   a sheet original stacking tray on which sheet originals to be treated are stacked as an original stack;
   a sheet original separating means for separating and supplying the sheet original one by one from the bottom of the original stack stacked on said sheet original stacking tray;
   a sheet original feeding path for directing the sheet original separated by said sheet original separating means;
   a sheet original feeding means for feeding the sheet original directed by said original feeding path to an image reading portion;
   a sheet original ejecting path for ejecting the sheet original fed by said sheet original feeding means to said sheet original stacking tray; and
   an auxiliary sheet original feeding apparatus which can be connected to said sheet original ejecting path, and wherein, when said auxiliary sheet original feeding apparatus is connected, said sheet original ejecting path serves as a bypass for directing the sheet original from said auxiliary sheet original feeding apparatus to said sheet stacking tray.

2. A sheet original feeding apparatus, comprising:
   a sheet original stacking tray on which sheet originals to be treated are stacked as an original stack;
   a sheet original separating means for separating and supplying the sheet original one by one from the original stack stacked on said sheet original stacking tray;
   a sheet original feeding path for directing the sheet original separated by said sheet original separating means;
   a sheet original feeding means for feeding the sheet original directed by said original feeding path to an image reading portion;
   a sheet original ejecting path for ejecting the sheet original fed by said sheet original feeding means to said sheet original stacking tray; and an auxiliary sheet original feeding apparatus which can be connected to said sheet original ejecting path, and wherein, when said auxiliary sheet original feeding apparatus is connected, said sheet original ejecting path serves as a bypass for directing the sheet original from said auxiliary sheet original feeding apparatus to said sheet original stacking tray.

3. A sheet original feeding apparatus according to claim 2, further comprising a sheet discharge tray, wherein, after all of sheet originals on said sheet original stacking tray are discharged on said sheet discharge tray, the sheet original is introduced from said auxiliary sheet feeding apparatus to said sheet original stacking tray via said bypass.

4. A sheet original feeding apparatus according to claim 3, wherein said sheet original stacking tray is disposed above said image reading portion, said sheet original feeding path is bent downwardly to introduce the original sheet to one side of said image reading portion, said sheet original ejecting path is bent upwardly from the other side of said image reading portion, said sheet discharge tray is provided above said bypass, and said auxiliary sheet original feeding apparatus is disposed at the other side of said image reading portion.

5. A sheet original feeding apparatus according to claim 4, wherein said auxiliary sheet original feeding apparatus is mounted onto said sheet original feeding apparatus as a unit.

6. A sheet original feeding apparatus according to claim 2, wherein said sheet original separating means separates and feeds the sheet original from bottom of the stacked sheets.

7. An image forming apparatus having a sheet original feeding apparatus, comprising:
  a sheet original stacking tray on which sheet originals to be treated are stacked as an original stack;
  a sheet original separating means for separating and supplying the sheet original one by one from the original stack stacked on said sheet original stacking tray;
  a sheet original feeding path for directing the sheet original separated by said sheet original separating means;
  a sheet original feeding means for feeding the sheet original directed by said original feeding path to an image reading portion;
  a sheet original ejecting path for ejecting the sheet original fed by said sheet original feeding means to said sheet original stacking tray;
  an auxiliary sheet original feeding apparatus which can be connected to said sheet original ejecting path, and wherein, when said auxiliary sheet original feeding apparatus is connected, said sheet original ejecting path serves as a bypass for directing the sheet original from said auxiliary sheet original feeding apparatus to said sheet original stacking tray; and
  means for forming an image read at said image reading means on a recording medium.

* * * * *

UNITED STATES PATENT AND TRADEMARK OFFICE
CERTIFICATE OF CORRECTION

Page 1 of 3

PATENT NO. : 5,192,976
DATED : March 9, 1993
INVENTOR(S) : Tadayuki Kitajima, et. al.

Figure 9B:
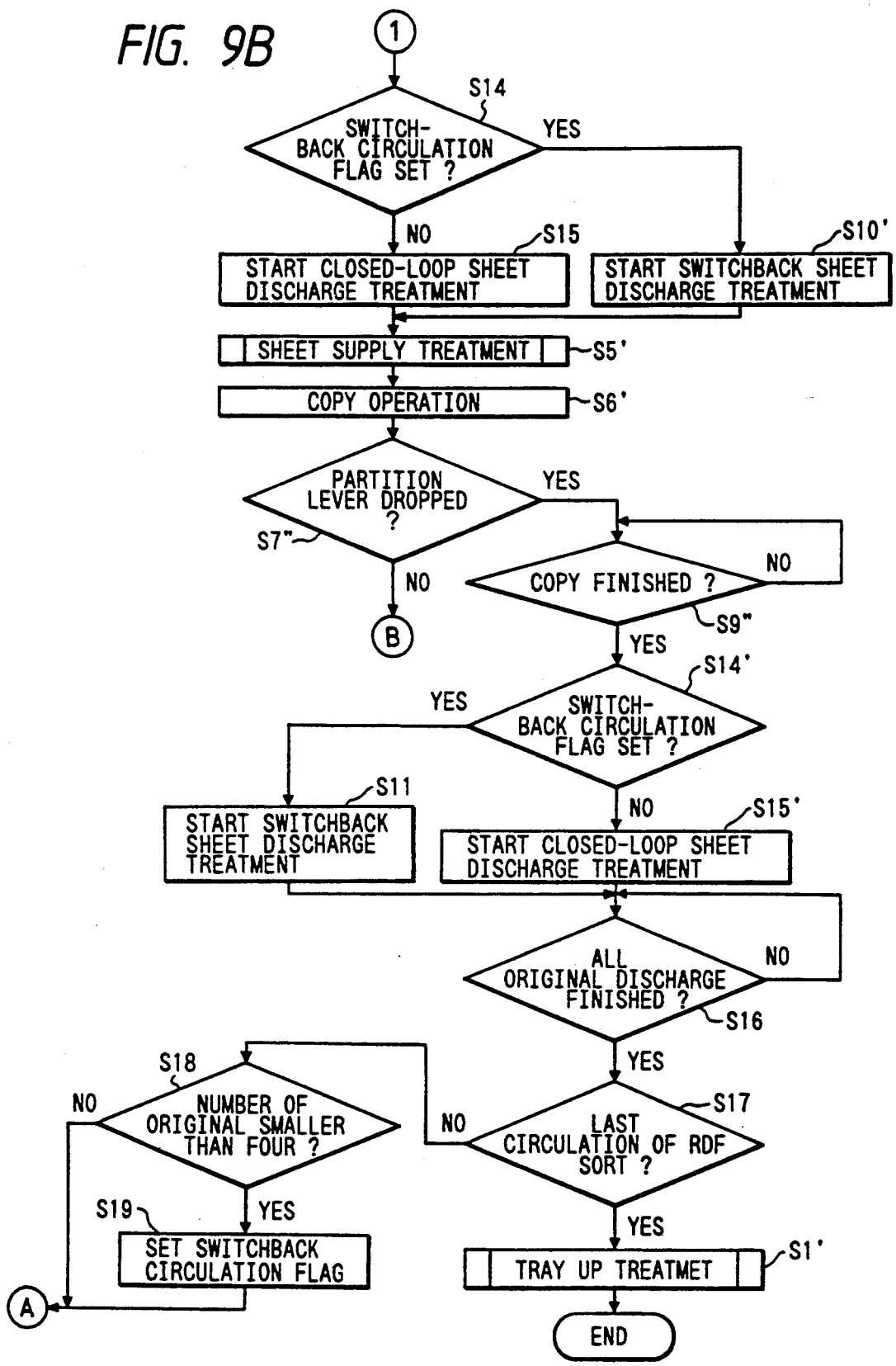

It is certified that error appears in the above-indentified patent and that said Letters Patent is hereby corrected as shown below:

IN THE DRAWINGS
    Sheet 7
        Fig. 9A, "MIXING DEMMAND" should read --MIXING DEMAND--.
    Sheet 8
        Fig. 9B, "TREATMET" should read --TREATMENT--.

COLUMN 2
    line 41, "extent" should read --extent.--.

COLUMN 3
    line 14, "original original" should read --original feeding apparatus which improves the productivity of the image treatment by shortening an original exchanging time and permitting the use of mixed originals having different sizes, by adopting only the merits of the above-mentioned switch-back RDF and the closed-loop RDF and by eliminating the demerits of such RDF's. ¶ According to the present invention a sheet original feeding apparatus comprises a sheet original stacking tray on which sheet originals to be treated are stacked as an original stack, a sheet original separating means for separating and feeding the sheet originals one by one from the bottom of the original stack rested on the stacking tray, a sheet feeding path for directing the sheet original separated

UNITED STATES PATENT AND TRADEMARK OFFICE
CERTIFICATE OF CORRECTION

PATENT NO. : 5,192,976
DATED : March 9, 1993
INVENTOR(S) : Tadayuki Kitajima, et. al.

It is certified that error appears in the above-indentified patent and that said Letters Patent is hereby corrected as shown below:

Column 3 (cont'd)
 by the separating means to an image reading portion, a first sheet ejecting path starting from the image reading portion at the same side as a side to which the sheet feeding path is terminated and extending from the image reading portion to the stacking tray, a second sheet ejecting path starting from the image reading portion at a side opposite to the side to which the sheet feeding path is terminated and extending from the image reading portion to the stacking tray. ¶ With this arrangement, if the sheet originals stacked on the stacking tray have different large and small sizes in an original feeding direction, each original--.

line 43, "view" should read --views--.

COLUMN 8
 line 23, "member" should read --member.--.

COLUMN 10
 line 15, "later" should read --latter--.

COLUMN 11
 line 27, "is" (second occurrence) should be deleted.
 line 29, "S9''.)" should read -- S9''),--.

COLUMN 13
 line 25, "is" (first occurrence) should be deleted--.

UNITED STATES PATENT AND TRADEMARK OFFICE
CERTIFICATE OF CORRECTION

PATENT NO. : 5,192,976

DATED : TADAYUKI KITAJIMA, ET AL.

INVENTOR(S) : March 9, 1993

It is certified that error appears in the above-identified patent and that said Letters Patent is hereby corrected as shown below:

COLUMN 15
    line 48, "nal" should read --nal.--.

COLUMN 16
    line 17, "FIG. 128." should read --FIG. 12B.--.
    line 22, "12C." should read --12C,--.

COLUMN 19
    line 6, "an" should be deleted.

Signed and Sealed this

Seventh Day of June, 1994

Attest:

BRUCE LEHMAN

Attesting Officer     Commissioner of Patents and Trademarks